US011589208B2

(12) United States Patent
Kim et al.

(10) Patent No.: US 11,589,208 B2
(45) Date of Patent: Feb. 21, 2023

(54) METHOD FOR TRANSMITTING DATA IN CIOT SYSTEM AND DEVICE THEREFOR

(71) Applicant: Samsung Electronics Co., Ltd., Suwon-si (KR)

(72) Inventors: Sung-Hoon Kim, Suwon-si (KR); Sung Hwan Won, Seoul (KR); Song-Yean Cho, Seoul (KR); Young-Kyo Baek, Seoul (KR); Sung-Jin Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 15/773,957

(22) PCT Filed: Nov. 4, 2016

(86) PCT No.: PCT/KR2016/012709
§ 371 (c)(1),
(2) Date: May 4, 2018

(87) PCT Pub. No.: WO2017/078491
PCT Pub. Date: May 11, 2017

(65) Prior Publication Data
US 2018/0332462 A1    Nov. 15, 2018

Related U.S. Application Data

(60) Provisional application No. 62/252,206, filed on Nov. 6, 2015.

(51) Int. Cl.
*H04W 8/08* (2009.01)
*H04W 28/02* (2009.01)
*H04W 8/02* (2009.01)

(52) U.S. Cl.
CPC ............ *H04W 8/02* (2013.01); *H04W 28/02* (2013.01)

(58) Field of Classification Search
CPC ............. H04W 8/02; H04W 28/0205; H04W 28/0215; H04W 28/02; H04W 4/70; H04W 8/04; H04W 72/1284
See application file for complete search history.

(56) References Cited

U.S. PATENT DOCUMENTS 9,167,499 B2    10/2015    Parsons et al.
2015/0003314 A1    1/2015    Kim et al.
(Continued)

FOREIGN PATENT DOCUMENTS

WO    2015138084 A1    9/2015

OTHER PUBLICATIONS

ISA/KR, "International Search Report and Written Opinion of the International Searching Authority," International Application No. PCT/KR2016/012709, dated Feb. 24, 2017, 13 pages.
(Continued)

*Primary Examiner* — Luat Phung

(57) ABSTRACT

The present disclosure provides a method whereby a mobility management entity (MME) in a cellular communication system transmits uplink data, the method comprising: receiving uplink data from a terminal; determining if the received uplink data is an Internet Protocol (IP) packet by examining the uplink data; transmitting the uplink data to a destination node via a packet data network (PDN) if the uplink data is an IP packet; and transmitting the uplink data to the destination node via a service capability exposure function (SCEF) if the uplink data is not an IP packet, wherein the uplink data comprises an indicator for indicating whether the uplink data is an IP packet.

10 Claims, 28 Drawing Sheets

(56) References Cited

U.S. PATENT DOCUMENTS

2018/0206093 A1* 7/2018 Jain .................. H04W 4/70
2018/0295556 A1* 10/2018 Baek ................. H04W 8/20
2018/0324652 A1* 11/2018 Ryu .................. H04W 8/04

OTHER PUBLICATIONS

3GPP TS 23.682 V.13.3.0 (Sep. 2015), Technical Specification, 3rd Generation Partnership Project; Technical Specification Group Services and System Aspects; Architecture enhancements to facilitate communications with packet data networks and applications (Release 13), 78 pages.
Intel, et al., "Introducing HSS-SCEF and MME/SGSN-SCEF Reference Points," S2-151271, 3GPP TSG-SA2 Meeting #108, San Jose del Cabo, Mexico, Apr. 13-17, 2015, 4 pages.
Samsung et al., "Introduction of Non-IP Data Delivery via the SCEF for Cellular IoT," S2-154310, 3GPP TSG-SA WG2 Meeting #112, Anaheim, CA USA, Nov. 16-20, 2015, 15 pages.
Supplementary European Search Report dated Jun. 6, 2018 in connection with European Patent Application No. 16 86 2506.
"3rd Generation Partnership Project; Technical Specification Group Services and System Aspects; Architecture enhancements for Cellular Internet of Things (Release 13)", 3GPP TR 23.720 v1.1.0, Oct. 2015, 90 pages.
Qualcomm Incorporated et al., "Comparison and conclusions for CIOT non-IP solutions", SA WG2 Meeting #111, Oct. 19-23, 2015, 5 pages.
Intel, "Solution for non-IP small data transmission via SCEF", SA WG2 Meeting #110ah, Aug. 31-Sep. 3, 2015, 5 pages.

* cited by examiner

METHOD FOR TRANSMITTING DATA IN CIOT SYSTEM AND DEVICE THEREFOR

CROSS-REFERENCE TO RELATED APPLICATIONS AND CLAIM OF PRIORITY

This application is a 371 National Stage of International Application No. PCT/KR2016/012709, filed Nov. 4, 2016, which claims the benefit of U.S. Provisional Application No. 62/252,206, filed Nov. 6, 2015, the disclosures of which are herein incorporated by reference in their entirety.

BACKGROUND

1. Field

The present disclosure relates to methods and systems for supporting IoT communication in mobile communication systems.

2. Description of Related Art

Generally, mobile communication systems have been developed to guarantee user activity while providing voice services. However, mobile communication systems have been expanding service areas from voice to data, and the systems have been grown to provide high-speed data services. However, more evolved mobile communication systems are required to live up to users' desire for higher-speed services and lacking resources that are faced by the current mobile communication systems. In response to such demand, the 3GPP has been standardizing LTE as a next-generation mobile communication system. LTE is the technology implementing high-speed packet-based communication with a transmission speed up to 100 Mbps.

In order to meet the demand for wireless data traffic storing since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

To enhance system networks in 5G communication systems or beyond 4G network communication systems, there are also being developed evolved small cell, enhanced small cell, cloud radio access network (RAN), ultra-dense network, device-to-device (D2D) communication, wireless backhaul, mobile network, cooperative communication, coordinated multi-points (CoMP), and reception interference removal techniques.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a Big data processing technique may be said to be an example of the convergence of the 5G and IoT technologies.

A radio access network (RAN) in a LTE mobile communication system may include a user equipment (UE), an evolved node B (hereinafter, "RAN node," "eNB," or "NodeB"), a core network node, e.g., mobility management entity (MME), a serving gateway (S-GW), a packet data network gateway (P-GW, PDN-gateway, or packet data network gateway), an application function (AF), or a policy control and charging rule function (PCRF). The radio access network may further include a universal terrestrial radio access network (UTRAN), a GSM EDGE radio access network (GERAN), a serving GPRS support node (SGSN), and a home subscriber server (HSS) or may be connected with such entity/system.

To manage the mobility of a UE, an eNB and a MME establish a connection, which is called S1 connection. The MME is a core entity for managing UE mobility and relays connection between the eNB and an S-GW/P-GW. A control signal from the UE is transmitted via the eNB to the MME. The MME, as necessary, negotiates with the S-GW/P-GW to process the control signal. A data signal from the UE is transmitted via the eNB to the S-GW/P-GW.

In order to manage the mobile coverage of the UE and control signaling congestion, MMEs may be operated in group, which is called MME pool. MMEs in the same pool manage areas they support (MME pool area) in tracking area (TA) units and provide services to a UE in a corresponding area. In case a tracking area supported by one MME pool is not supported by another MME pool, the two MME pools may be called non-overlapping MME pools. In contrast, in case one MME pool overlappingly supports a tracking area supported by another MME pool, the two MME pools are called overlapping MME pools, and the overlapping MME pools formed by the two MME pools, themselves, are a MME pool and a non-overlapping MME pool different from the two MME pools.

An eNB may support several tracking areas and divides a tracking area into several cells to manage mobility in cell units. An eNB may manage each cell in association with a tracking area code (TAC) in order to distinguish from the tracking area where the cell belongs.

SUMMARY

The present disclosure describes methods and apparatuses for transferring CIoT messages.

Further, according to the present disclosure, there are proposed methods and apparatuses for determining a time of transmission according to the type of a group message, i.e., the characteristics of content or distinguishing information contained according to an application signaling time.

Further, according to the present disclosure, there are proposed methods and apparatuses for obtaining routing information of entities in a roaming network.

Further, according to the present disclosure, there are proposed methods and apparatuses for merging or separating network bearers of MCPTT-related services.

Further, according to the present disclosure, there are proposed methods and apparatuses for restoring a connection of a user plane gateway that has been separated.

Further, according to the present disclosure, there are proposed methods and apparatuses for selecting a separated user plane gateway.

Further, according to the present disclosure, there are proposed methods and apparatuses for establishing a connection for a CIoT UE to send data.

Further, according to the present disclosure, there are proposed methods and apparatuses for updating a data allocation sent from a CIoT UE.

Further, according to the present disclosure, there are proposed methods and apparatuses for managing connectivity of a CIoT UE.

Further, according to the present disclosure, there is proposed a configuration of an apparatus for implementing the above methods.

According to the present disclosure, there is provided a method for transferring uplink data by a mobility management entity (MME) in a cellular communication system, comprising receiving the uplink data from a user equipment (UE), examining the received uplink data to determine whether the uplink data is an internet protocol (IP) packet, if the uplink data is the IP packet, transmitting the uplink data through a packet data network (PDN) to a destination node, and if the uplink data is not the IP packet, transmitting the uplink data through a service capability exposure function (SCEF) to the destination node, wherein the uplink data includes an indicator indicating whether the uplink data is the IP packet.

According to the present disclosure, there is provided a mobility management entity (MME) transferring uplink data in a cellular communication system, comprising a transceiver unit receiving the uplink data from a user equipment (UE) and a controller examining the received uplink data to determine whether the uplink data is an internet protocol (IP) packet and controlling the transceiver unit to, if the uplink data is the IP packet, transmit the uplink data through a packet data network (PDN) to a destination node, and if the uplink data is not the IP packet, transmit the uplink data through a service capability exposure function (SCEF) to the destination node, wherein the uplink data includes an indicator indicating whether the uplink data is the IP packet.

According to the present disclosure, there is provided a method for transferring uplink data by a service capability exposure function (SCEF) in a cellular communication system, comprising receiving the uplink data from a mobility management entity (MME), identifying a connection with a destination node using an SEEF reference ID included in the uplink data, and transmitting the uplink data to the identified destination node, wherein the uplink data includes an indicator indicating whether the uplink data is the IP packet.

According to the present disclosure, there is provided a service capability exposure function (SCEF) for transferring uplink data in a cellular communication system, comprising a transceiver unit receiving the uplink data from a mobility management entity (MME) and a controller identifying a connection with a destination node using an SEEF reference ID included in the uplink data and controlling the transceiver unit to transmit the uplink data to the identified destination node, wherein the uplink data includes an indicator indicating whether the uplink data is the IP packet.

According to the present disclosure, non-IP data may be efficiently transmitted through an SCEF.

Further, according to the present disclosure, it is possible to determine a time of transmission according to the type of a group message, i.e., the characteristics of content or distinguish information contained according to an application signaling time.

Further, according to the present disclosure, it is possible to obtain routing information of entities in a roaming network.

Further, according to the present disclosure, network bearers of MCPTT-related services may be merged or separated, enabling support of a material call even in limited resources.

Further, according to the present disclosure, there is provided a method for quickly restoring a connection of a user plane gateway that has been separated.

Further, according to the present disclosure, it is possible to select a separated user plane gateway and transmit data.

Further, according to the present disclosure, it is possible to establish connection for a CIoT UE to send data.

Further, according to the present disclosure, since a data allocation sent from a CIoT UE may be updated even after initial access, the user's demand may be properly reflected.

Further, according to the present disclosure, the connectivity of a CIoT UE may be flexibly managed.

DETAILED DESCRIPTION

Figure 1:
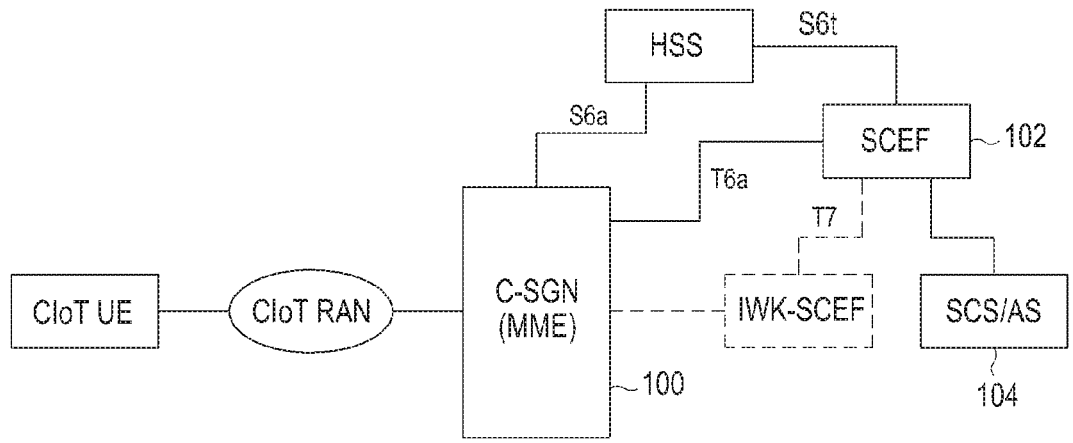
FIG. 1 is a view illustrating an example of a CIoT architecture for non-IP data transmission through an SCEF according to the present disclosure.

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

Hereinafter, some of the terms and names defined in 3GPP LTE standards may be used for ease of description. However, the present disclosure is not limited to the terms and names and may apply likewise to systems following other standards.

The description of embodiments of the present disclosure primarily targets RAN, core network (CN), LTE, and evolved packet core (EPC) which have been standardized by the 3GPP, but the subject matter of the present disclosure may also be applicable to other communication systems with a similar technical background with minor changes without significantly departing from the scope of the present disclosure, and this may be possible under the determination of those skilled in the art to which the present disclosure pertains.

As set forth below, the terms "LTE UE" and "IoT UE" mean mobile terminals capable of wireless communication, examples of which include a personal information assistant (PDA) equipped with communication functionality, a smartphone, a mobile phone, a tablet computer, or a laptop computer, a measuring terminal for checking tab water usage, electricity usage, or temperature, as ones other than personal devices, a terminal recognizing and reporting a situation, such as a fire alarm or earthquake alarm, or a home appliance equipped with communication functionality, such as an air conditioner, a refrigerator, an air purifier, a boiler, or a cleaner. All other communicable objects than those mentioned above are herein termed "IoT UEs." Further, among IoT UEs, UEs using a cellular network are termed CIoT UEs. CIoT UE may mean a UE that sends a small volume of data (hereinafter, "small data") over a LTE network. Devices, functions, and operations for a CIoT service according to the present disclosure include devices, functions, and operations for small data transmission (SDT) on a LTE network. IoT data may mean data sent from a IoT UE or a small volume of data sent from any type of UE.

IoT device may include a mobile communication (e.g., LTE) module or a short-range communication (e.g., bluetooth, wireless fidelity (Wi-Fi), zigbee, or NFC) module. A LTE UE may operate on a LTE carrier frequency or an ISM band.

As used herein, CIoT represents a IoT service using a cellular network. CIoT service means a cellular service for supporting a IoT terminal or may mean a service of sending a small volume of data through a cellular network. Also, CIoT may include a MTC service. Here, cellular network, in its concept, includes a core network as well as a RAN.

Hereinafter, a method and apparatus for transferring a small size message according to the present disclosure are described with reference to FIGS. 1 to 5.

FIG. 1 is a view illustrating an example of a CIoT architecture for non-IP data transmission through an SCEF according to the present disclosure.

Referring to FIG. 1, a C-SGN 100 is a network entity consisting of a MME, an S-GW, and a P-GW and means a lightened core network for a CIoT. In the network structure, a T6a interface is an interface for connecting the MME (i.e., the C-SGN) 100 with a service capability exposure function (SCEF) 102. The MME 100 may transfer a small size message (e.g., non-IP data) using the T6a interface. The message may be transferred from the SCEF 102 to a services capability server (SCS)/application server (AS) 104.

Figure 2:
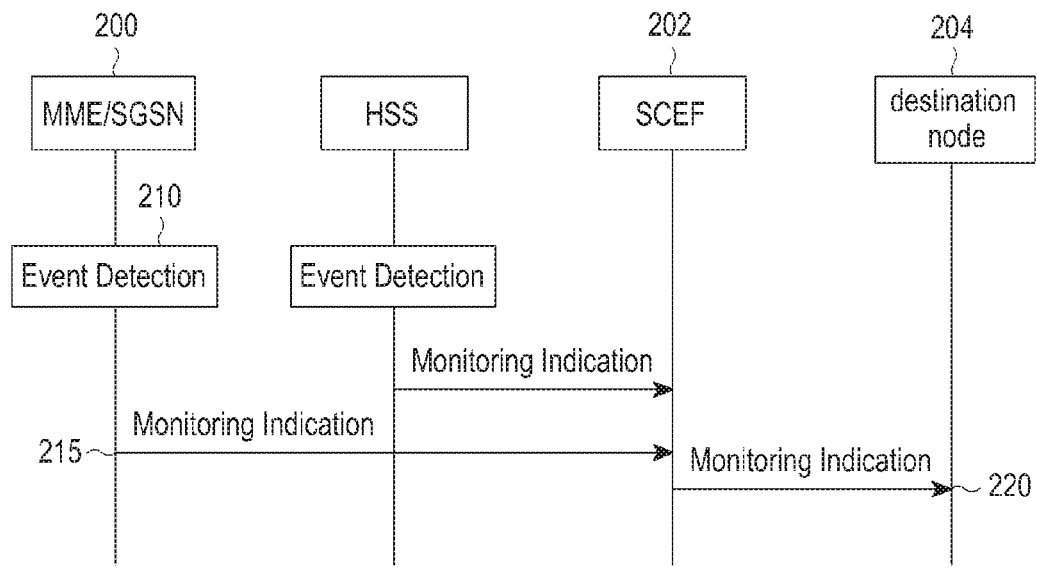
FIG. 2 is a view illustrating an example of a procedure for a MME to transmit non-IP data through an SCEF.

FIG. 2 is a view illustrating an example of a procedure for a MME to transmit non-IP data through an SCEF.

In FIG. 2, a UE may transmit uplink non-IP data, which is desired to be sent to a destination node (e.g., an SCS/AS 204), through a MME 200 and an SCEF 202. A scheme in which the UE transmits to the destination node 204 may be called a mobile originated (MO) scheme because the UE corresponds to an originator. Here, the non-IP data is all protocol types of data not having a typical IP packet structure and may be, e.g., data containing no IP packet header. Because of being larger than a message whose IP packet header is relatively small, a type of data containing no IP packet header, i.e., non-IP data, is used for CIoT transmission. Accordingly, the non-IP data may be called non-structured data.

When a particular event occurs, a MME/serving GPRS support node (SGSN) 200 may receive data from the UE via a RAN (210). Here, the received data may include an indicator indicating whether the received data is non-IP data or not. Or, the MME/SGSN 200 may directly read the data packet to determine whether it is an IP packet or not. If the received data is an IP packet, the MME/SGSN 200 may send the data to the P-GW or directly transfer it to the PDN. If the received data is not IP data (i.e., if it is non-IP data), the MME/SGSN 200 may transfer the data through the SCEF 202 to the destination node 204.

When the UE roams, the MME 200 may transfer data received by the SCEF 202 of the home public land mobile network (HPLMN) through the interworking-SCEF (IWK-SCEF). For example, the event may be set as a monitoring event or SDT, indicating that the message is one for small data transmission.

The MME/SGSN 200 transfers a message including non-IP data to the SCEF (215). Since the message 215 includes an SCEF reference ID, the MME/SGSN 200 and the SCEF 202 may identify the connection between the SCEF 202 and the MME 200 by the SCEF reference ID.

The SCEF 202 may identify the SCEF reference ID of the received message to obtain an SCS/AS reference ID associated with the SCEF reference ID. The SCS/AS reference ID is an identifier used between the application server (i.e., an SCS/AS) 204 and the SCEF 202, and the SCEF and the application server (i.e., the SCS/AS) may identify each other using the ID. The message received by the SCEF may include, e.g., a monitoring destination address that may be an address of the application server (i.e., the SCS/AS).

If the message received by the SCEF lacks the SCS/AS reference ID, the SCEF may determine the destination of the received message using the address of the SCS/AS. The SCEF may transmit the non-IP data received at No. 2 to the determined destination (220). Here, the message 220 may further include the SCS/AS reference ID or an identifier allowing the UE to be identified in the SCS/AS. The identifier allowing the UE to be identified may be, e.g., the UE's external ID or mobile station international subscriber directory number (MSISDN).

Figure 3:
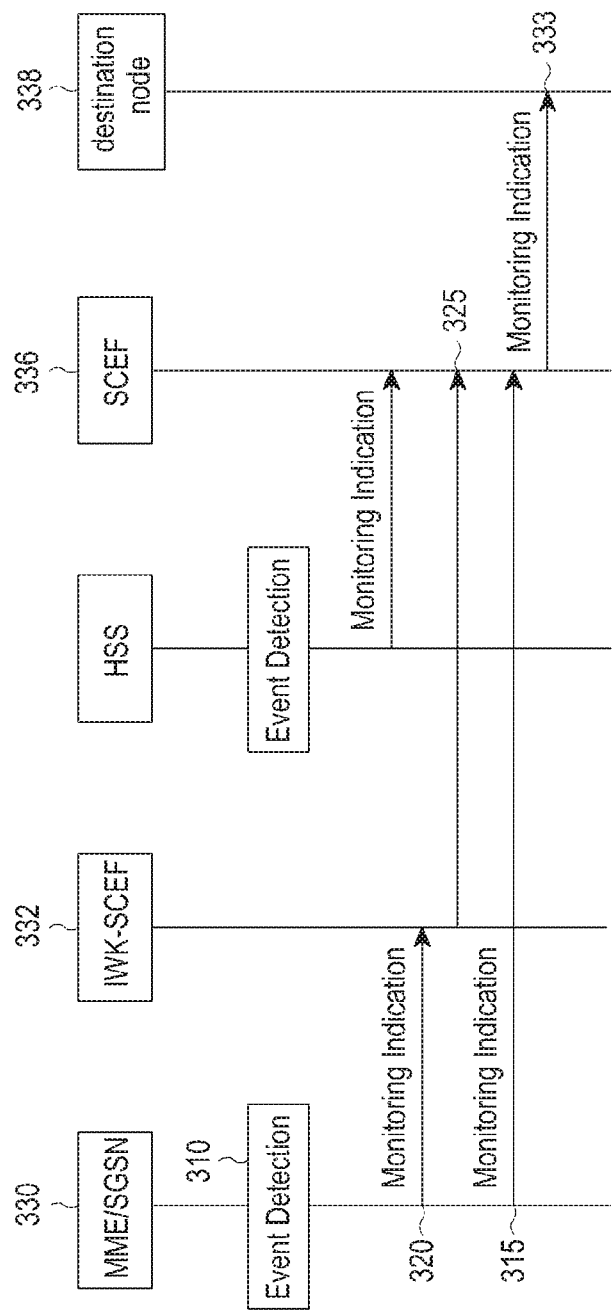
FIG. 3 is a view illustrating an example of a procedure for transmitting non-IP data while a UE is roaming.

FIG. 3 is a view illustrating an example of a procedure for transmitting non-IP data while a UE is roaming.

In FIG. 3, a MME 330 and an IWK-SCEF 332 are entities in a roaming network, and an SCEF 336 is an entity in a home network.

The MME/SGSN 330 receives data from a UE via a RAN (310). Here, the received data may include an indicator indicating whether the data is IP data or not. Or, the MME/SGSN 330 may directly look to the data packet, and if the data is IP data, it may send the data to a P-GW or directly to a PDN, and if the data is non-IP data, it may transfer the data through an IWK-SCEF 332 to an application server 338. For example, it may set a monitoring event as an SDT or non-IP data delivery configuration (NIDD) to indicate that the message is one for data transmission.

Unless the MME/SGSN 330 is configured to use the IWK-SCEF 332, the MME/SGSN 330 may perform operation 215 of FIG. 2. That is, the MME/SGSN 330 may directly transmit the message to the SCEF 336 in the home network (315). The transmitted message may contain an SCEF reference ID. The MME/SGSN may additionally generate charging/account information.

If the MME/SGSN 330 is configured to transmit a message to the IWK-SCEF 332 for a roaming UE, the MME/SGSN 330 transfers a message containing non-IP data received from the roaming UE to the IWK-SCEF 332. The message may contain the SCEF reference ID. The SCEF reference ID is used to identify connections among the MME/SGSN 330, the IWK-SCEF 332, and the SCEF 336 of the home network for the UE.

The IWK-SCEF 332 transfers the received message to the SCEF 336 (325). The message may contain the non-IP data sent from the UE and the SCEF reference ID by which the SCEF-UE connection may be identified.

The SCEF 336 identifies the SCEF reference ID of the received message, obtaining the SCS/AS reference ID associated with the SCEF reference ID. The SCS/AS reference ID is an identifier used between the application server (SCS/AS) 338 and the SCEF 336, and the SCEF 336 and the application server (SCS/AS) 338 may identify each other using the ID. The message received by the SCEF 336 may contain the address of the destination node 338. The address of the destination node 338 means the address of the application server (SCS/AS) 338. If there is no SCS/AS reference ID, it may use the address of the SCS/AS 338 to determine the destination of the received message. The SCEF 336 transmits the non-IP data received in operation 315 or 325 to the determined destination 338 (333). Here, the message 333 may further include the SCS/AS reference ID or an identifier allowing the UE to be identified in the SCS/AS 338. The identifier by which the UE may be identified may be, e.g., the UE's external ID or MSISDN.

Figure 4:
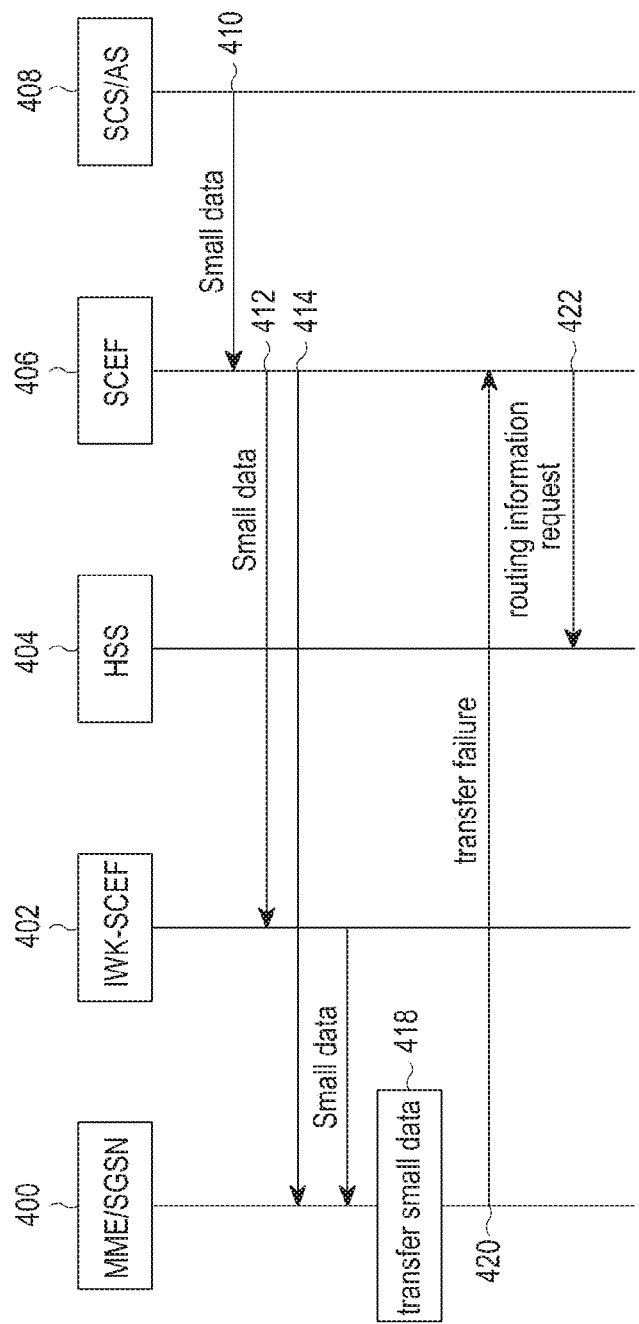
FIG. 4 is a view illustrating an example of a procedure for a UE to receive non-IP data.

FIG. 4 is a view illustrating an example of a procedure for a UE to receive non-IP data.

The scheme in which the UE receives non-IP data may be referred to as a mobile terminated (MT) scheme because the UE corresponds to a terminator.

An SCS/AS 408 transfers MT non-IP data (i.e., small data) to an SCEF 406 (410). Here, the SCS/AS 408 may transfer the small data, along with an SCS/AS reference ID and/or SCS/AS identifier.

In case an IWK-SCEF 402 is used, the SCEF 406 may transfer MT small data to the IWK-SCEF 402 (412). The SCEF 406 may transfer an SCEF reference ID and/or SCEF ID together with the MT small data. Here, the SCEF 406 may discover the ID of the IWK-SCEF 402 as follows. For example, the SCEF 406 discovers the SCEF reference ID associated with the SCS/AS reference ID received in step 410. The SCEF 406 may discover the IWK-SCEF ID associated with the SCEF reference ID. The IWK-SCEF 402 transfers the MT small data to the MME/SGSN 400 (416). Here, the IWK-SCEF 406 may discover routing information about the MME/SGSN 400. For example, the IWK-SCEF 406 may discover routing information associated with the received SCEF reference ID. Alternatively, when the IWK-SCEF 402 transfers MT small data, the IWK-SCEF 402 may transmit an IMSI, an SCEF reference ID, an SCEF ID, and/or an IWK-SCEF ID together with the MT small data. The SCEF ID may be an address or name representing the SCEF.

Meanwhile, unless the IWK-SCEF 402 is used, the SCEF 406 may transfer MT small data to the MME/SGSN 400 (414). Here, the SCEF 406 may discover the routing information of the MME/SGSN 400 as follows. For example, the SCEF 406 may discover routing information associated with the received SCEF reference ID. Alternatively, the SCEF 406 may transfer, together with MT small data, an IMSI for identifying the UE and an SCEF reference ID and/or SCEF ID for identifying the connection between the UE and the SCEF.

Receiving the MT small data, the MME/SGSN 400 may transfer the MT small data to a UE that the IMSI indicates (418).

The MME/SGSN 400 may not serve the UE. In this case, the MME/SGSN 400 may notify the SCEF, directly or via the IWK-SCEF, that the transfer of MT small data has failed (420). Here, the SCEF 406 may send a request for MME/SGSN routing information of the UE to an HSS 404 (422). The SCEF, upon requesting routing information, may use an external ID or international mobile subscriber identity (IMSI) as the UE's ID. The HSS 404 may transfer routing information to the SCEF in response to the request 422.

HSS 404, and if the IWK-SCEF is used, the SCEF may transfer, to the IWK-SCEF, routing information in addition to the MT small data.

Figure 5:
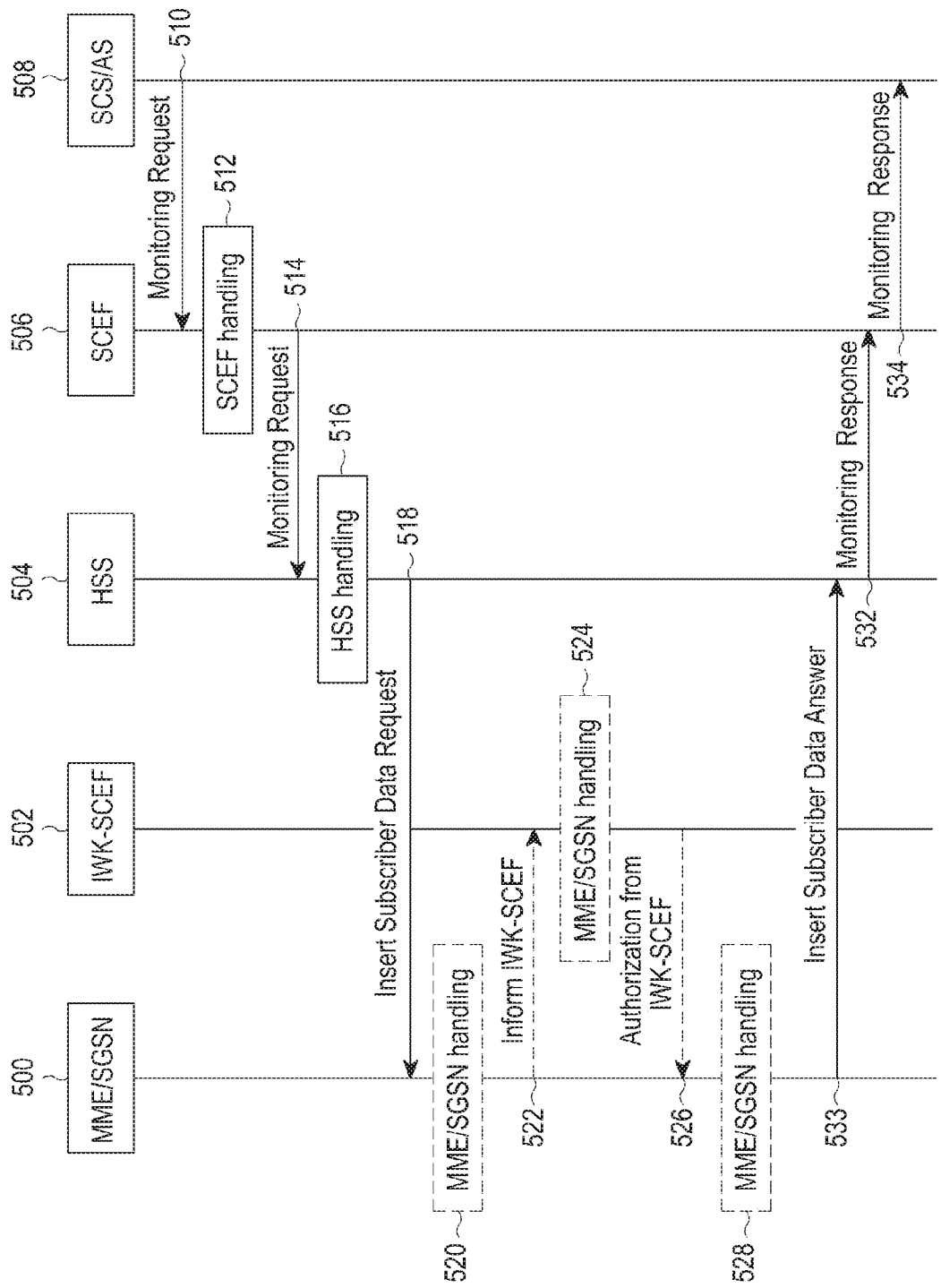
FIG. 5 is a view illustrating an example of a procedure for setting a small data transmission (SDT) or releasing the setting.

FIG. 5 is a view illustrating an example of a procedure for setting a small data transmission (SDT) or releasing the setting.

In FIG. 5, where an IWK-SCEF 502 is present is described. In FIG. 5, if steps 520 and 528 are performed as a single step, with steps 522 to 526 omitted, where no IWK-SCEF is present may be implemented.

An SCS/AS 508 may send a message requesting for an SDT to an SCEF 506 (510). The request message may be, e.g., a monitoring request message. The request message may contain an external ID or MSISDN allowing for identification of a UE, an SCS/AS ID allowing for identification of the SCS/AS, an SCS/AS reference ID for identifying a connection between the SCS/AS and the SCEF, or a parameter indicating to set up a small data transmission. The external ID is an identifier mapped with an IMSI in an HSS 504, and the SCEF 506 happens to know what IMSI the external ID corresponds to through signaling with the HSS 504. The parameter indicating being an SDT may include a traffic category (refer to Table 1), an uplink data size, a downlink data size, a maximum uplink data size simultaneously transmittable, a maximum downlink data size simultaneously transmittable, or a frequency as to how frequent messages may be communicated.

Table 1 illustrates a traffic modem for CIoT as the traffic category.

TABLE 1

| Category | Example of application | UL data size | DL data size | Frequency |
|---|---|---|---|---|
| Mobile Autonomous Reporting (MAR) exception reports | smoke alarm detectors, power failure notifications from smart meters, tamper notifications etc. | 20 bytes | 0 AC K payload size is assumed to be 0 bytes | Every few months, Every year |
| Mobile Autonomous Reporting (MAR) periodic reports | smart utility (gas/water/electric) metering reports, smart agriculture, smart environment etc. | 20 bytes with a cut off of 200 bytes i.e. payloads higher than 200 bytes are assumed to be 200 bytes. | 50 % of UL data size AC K payload size is assumed to be 0 bytes | 1 day (40%), 2 hours (40%), 1 hour (15%), and 30 minutes (5%) |
| Network Command | Switch on/off, device trigger to send uplink report, request for meter reading | 0-20 bytes 50% of cases require UL response. | 20 bytes | 1 day (40%), 2 hour (40%), 1 hour (15%), and 30 minutes (5%) |
| Software update/reconfiguration model | Software patches/updates | 200 bytes with a cut off of 2000 bytes i.e. payload higher than 2000 bytes are assumed to be 2000 bytes. | 200 bytes with a cut off of 2000 bytes i.e. payload higher than 2000 bytes are assumed to be 2000 bytes. | 180 days |

Here, the HSS 404 does not necessarily need to include IMSI information in the response.

Thereafter, steps 412 to 418 may be repeated. The repeated steps differ from original steps 412 to 418 in that the repeated steps use routing information obtained from the The MME/SGSN or C-SGN 500 or SCEF 506 or IWK-SCEF 502 may control uplink/downlink data transmission according to the traffic category. For example, if the traffic category is a mobile autonomous reporting (MAR) periodic report, uplink (UL) data may have a size larger than 200 bytes. As another example, if the traffic category is a MAR periodic report, uplink data having a frequency whose period is less than 30 minutes is not transmitted. The transmission control of such data traffic may be performed by the MME/SGSN/C-SGN 500 for uplink and by the SCEF 506 or IWK-SCEF 502 for downlink.

The SCEF stores the SCS/AS reference ID, the UE's ID, and parameter for small data transmission received in step 510. Further, the SCEF assigns an SCEF reference ID for the request (512). If the SCS/AS 508 has not been permitted to perform SDT as per the service provider's policy, if the request message has a wrong format, or if the SCS/AS 508 exceeds the allocation for requesting the SDT, the SCEF 506 transfers an error along with a proper cause value to the SCS/AS 508. The SCEF 506 identifies the parameter for SDT. If none of such parameters comply with the service provider's policy, the request is rejected.

The SCEF 506 transfers a request for SDT to the HSS 504 based on information received in the above step (514). According to the parameter included in the request message 514, the HSS 504 may configure the parameter for SDT in the MME/SGSN/C-SGN 500.

The HSS 504 examines the request 514 to determine whether there is the UE's ID (external ID or MSISDN) or whether the included parameter is acceptable to the mobile communication service provider (516). The HSS 504 may identify the ID for billing to make a permission. Unless permitted, a reject message and cause are transmitted to the SCEF.

The HSS 504 sends a message for configuring SDT to the MME/SGSN/C-SGN 500 (518). The message 518 is transferred containing the parameter for configuring SDT, SCEF ID, SCEF reference ID, ID for billing, and UE's ID.

The MME/SGSN/C-SGN 500 stores the parameters received in step 518 (520). Thereafter, data transmission for the UE may begin. The MME/SGSN/C-SGN 500, if the SDT-related value as set by the HSS 504 does not comply with the mobile communication service provider's policy, may send a reject message in response to step 518.

If the UE is a roaming UE, the MME/SGSN/C-SGN 500 may transfer the SDT-related configuration parameter to the IWK-SCEF 502 (502). The message 522 may include at least one of SCEF ID, SCEF reference ID, ID for billing, parameter for SDT, IMSI which is the UE's identifier, and routing information for MME/SGSN/C-SGN. The IMSI and MME/SGSN/C-SGN routing information may be transferred only in cases where the IWK-SCEF 502 is used and/or in case of SDT (or otherwise in cases where information may be transferred by the SCS/AS and/or SCEF).

The IWK-SCEF 502 may perform downlink data transmission using the IMSI and MME/SGSN/C-SGN routing information. The MME/SGSN/C-SGN 500 may transfer the IMSI(s) received in step 518. The MME/SGSN/C-SGN routing information is entity information regarding the core network served by the UE that each IMSI indicates. The IWK-SCEF 502 maps the IMSI and routing information with the SCEF reference ID and stores the same.

The IWK-SCEF may perform permission for the SDT request as if the SCEF has done in step 520 (526). If the procedure for permitting the SDT request fails, a reject message together with a proper cause value is sent to the MME/SGSN/C-SGN 500. If the permission for the SDT request succeeds, the IWK-SCEF 502 stores the received parameter and sends an ACK to the MME/SGSN/C-SGN 500, informing that the SDT has been set up.

The MME/SGSN/C-SGN 500 identifies the request received from the IWK-SCEF 502. It identifies whether SDT is also applicable to roaming and identifies whether service may be provided for the UE's HPLMN. Unless permitted, an error message is sent to the IWK-SCEF 502. If the UE is not a roaming UE, the MME/SGSN/C-SGN 500 identifies whether the UE may use SDT through the SCEF 506 subsequent to the procedures of steps 518 and 520. Unless the SDT for the UE has been permitted, the MME/SGSN/C-SGN 500 sends a reject message indicating that the SDT has not been permitted to the SCEF.

If the SDT configuration for the UE succeeds, the MME/SGSN/C-SGN 500 sends an ACK message to the HSS 504, informing that the SDT configuration has been successfully performed (530). The ACK message 530 may be an "Insert Subscriber Data Answer" message. The message 530 may include a cause value and an IWK-SCEF ID. The message 530 may be performed in response to an SDT request that has been sent from the HSS or SCEF. The name of the message is not limited to SDT, meaning a request message for transmitting non-IP data.

If the HSS 504 receives the successful performing of SDT from the MME/SGSN/C-SGN 500 in step 530, the HSS 504 sends, to the SCEF 506, a message indicating that the SDT configuration has been successfully performed (532). The message 532 may include an SCEF reference ID indicating an SCEF connection for the UE, IMSI, as the UE's identifier, routing information for sending a message to the MME/SGSN/C-SGN, and if the UE is a roaming UE, an IWK-SCEF ID. The IMSI and MME/SGSN/C-SGN routing information may be transferred only in cases where the IWK-SCEF 502 is used and/or in case of SDT (or otherwise in cases where information may be transferred by the SCS/AS and/or SCEF). The IWK-SCEF 502 may perform downlink data transmission using the IMSI and MME/SGSN/C-SGN routing information. The MME/SGSN/C-SGN 500 may transfer the IMSI(s) received in step 518. The MME/SGSN/C-SGN routing information is entity information regarding the core network served by the UE that each IMSI indicates. The IWK-SCEF 502 maps the IMSI and routing information with the SCEF reference ID and stores the same.

Having identified that the SDT configuration for the UE has been completed, the SCEF 506 sends, to the SCS/AS 508, a message indicating that the SDT configuration has been completed (534). The message 534 may include an SCS/AS reference ID and a cause value indicating that the SDT has been successfully configured.

Figure 6:
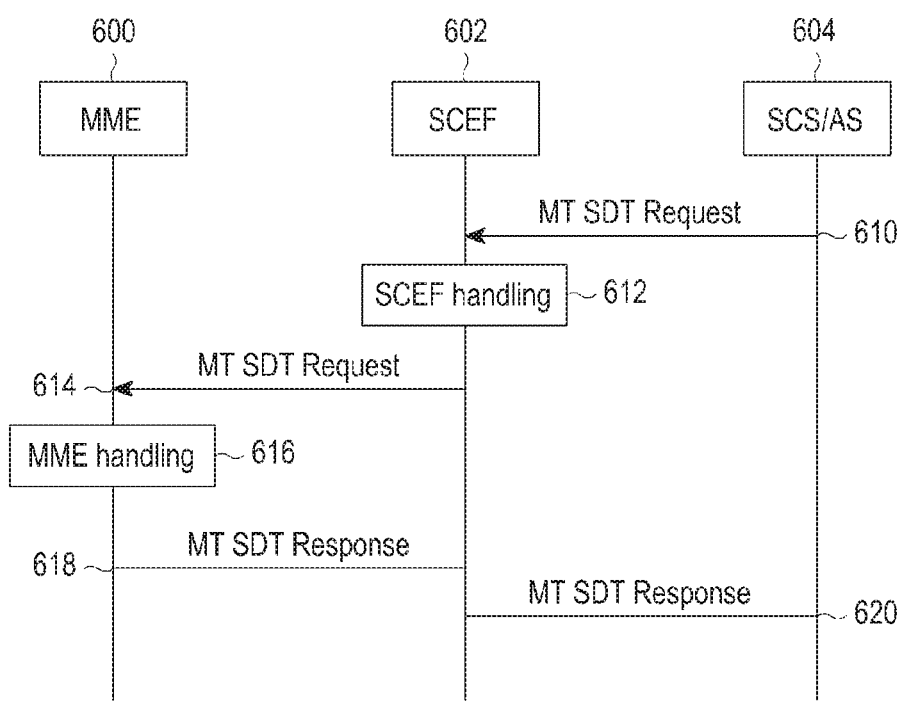
FIG. 6 is a view illustrating an example of a procedure for an application server t transmit non-IP data to a UE.

FIG. 6 is a view illustrating an example of a procedure for an application server to transmit non-IP data to a UE.

In FIG. 6, the SCS/AS 604 may send non-IP data to the UE after the SDT configuration for the UE has been complete. The SCS/AS 604 may determine which SCS/AS reference ID is to be used or which SCEF transmission is made to depending on the SDT configuration procedure. As a result of the SDT configuration procedure, the SCEF 602 may determine which SCEF reference ID is to be used for the non-IP data received from the SCS/AS 604 and which IMSI the UE is to use.

The SCS/AS 604 puts the non-IP data that is to be sent to the UE in a message and sends the message to the SCEF 602 (610). The message 610 includes an SCS/AS reference ID and a non-IP-type of small data which to be sent to the UE.

By looking to the received SCS/AS reference ID, the SCEF 602 may identify which MME/SGSN/C-SGN data is to be sent and which UE the data is sent to and discover the SCEF reference ID or IMSI corresponding thereto (612). If the SCS/AS 604 has not been permitted to perform SDT as per the mobile communication service provider's policy or if the frequency at which the SCS/AS may transmit exceeds, the SCEF may perform step 620 to reject the SDT request.

The SCEF 602 transfers the small data transmission (SDT request) received in step 610 to the MME/SGSN/C-SGN 600 (614). The message 614 may include an SCEF reference ID indicating a connection with the SCEF for the UE. Further, the message 614 may include an IMSI for identifying the UE. The message 614 includes non-IP data for transmission to the UE.

The MME/SGSN/C-SGN 500 receives the request and then verifies the request (66). Upon failure, it notifies the SCEF 602 that the small data transmission request (SDT request) has failed in step 618. Causes for the failure may be where no more SDT service is possible as per the mobile communication service provider's policy, where the allocation of SDT transmission that the SCEF may send exceeds, or where the frequency of transmission exceeds.

If, as a result of identifying the request received in step 614, the MME/SGSN/C-SGN 600 determines that an SDT service may not be provided, the MME/SGSN/C-SGN 600 transmits the non-IP data received in step 614 to the UE. The non-IP data may be delivered through NAS signaling.

After delivering the non-IP data to the UE, the MME/SGSN/C-SGN 600 sends a response to the SCEF 602, informing that the SDT request has been processed (618). Or, if the non-IP data transmission for the UE has failed or has not been permitted, it notifies the SCEF that the SDT request has failed (618).

The SCEF 602 notifies the SCS/AS 604 of result of the SDT request (620).

Figure 7:
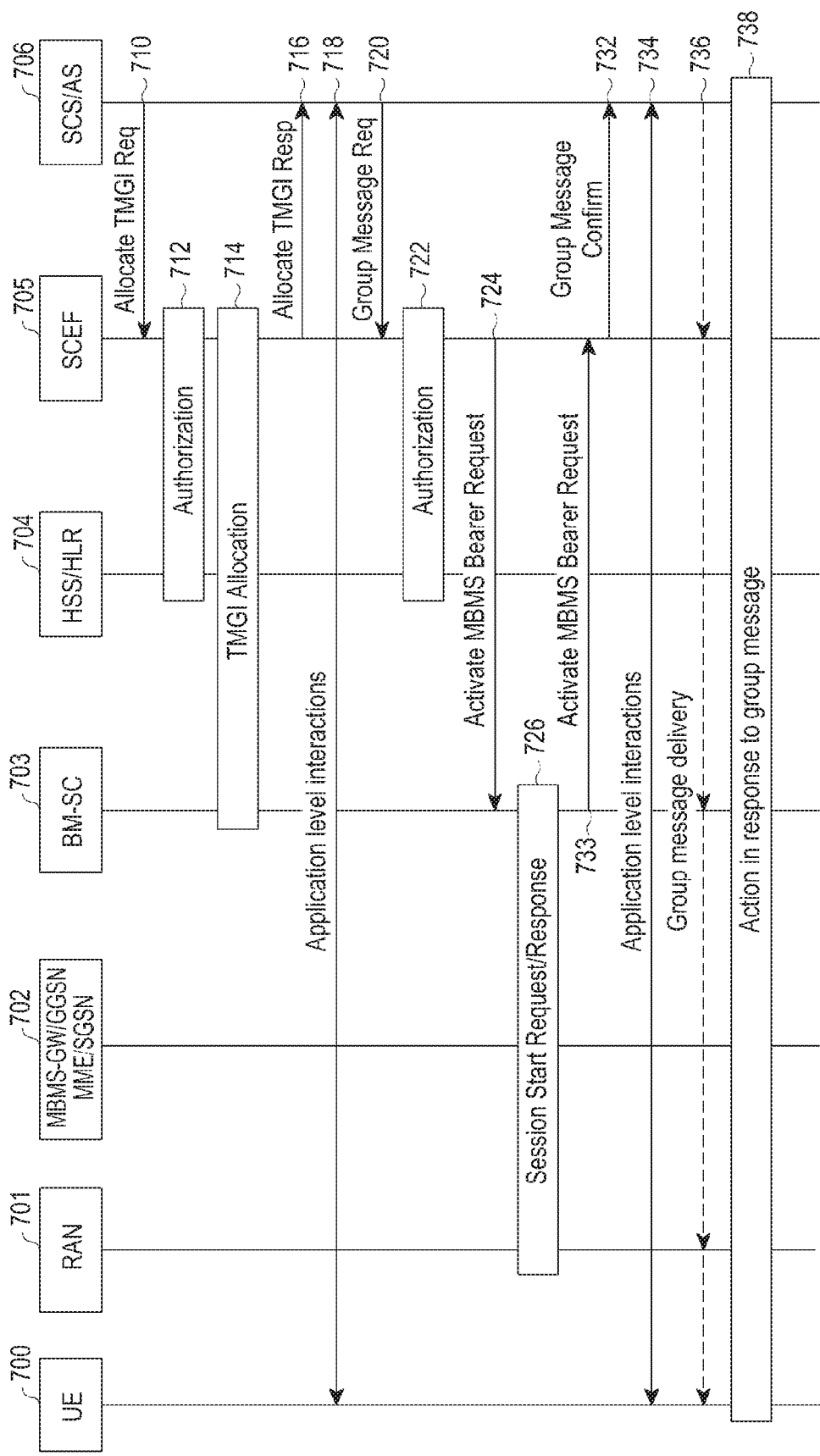
FIG. 7 is a view illustrating a method for transferring a group message using a multimedia broadcast multicast service (MBMS)
Figure 8:
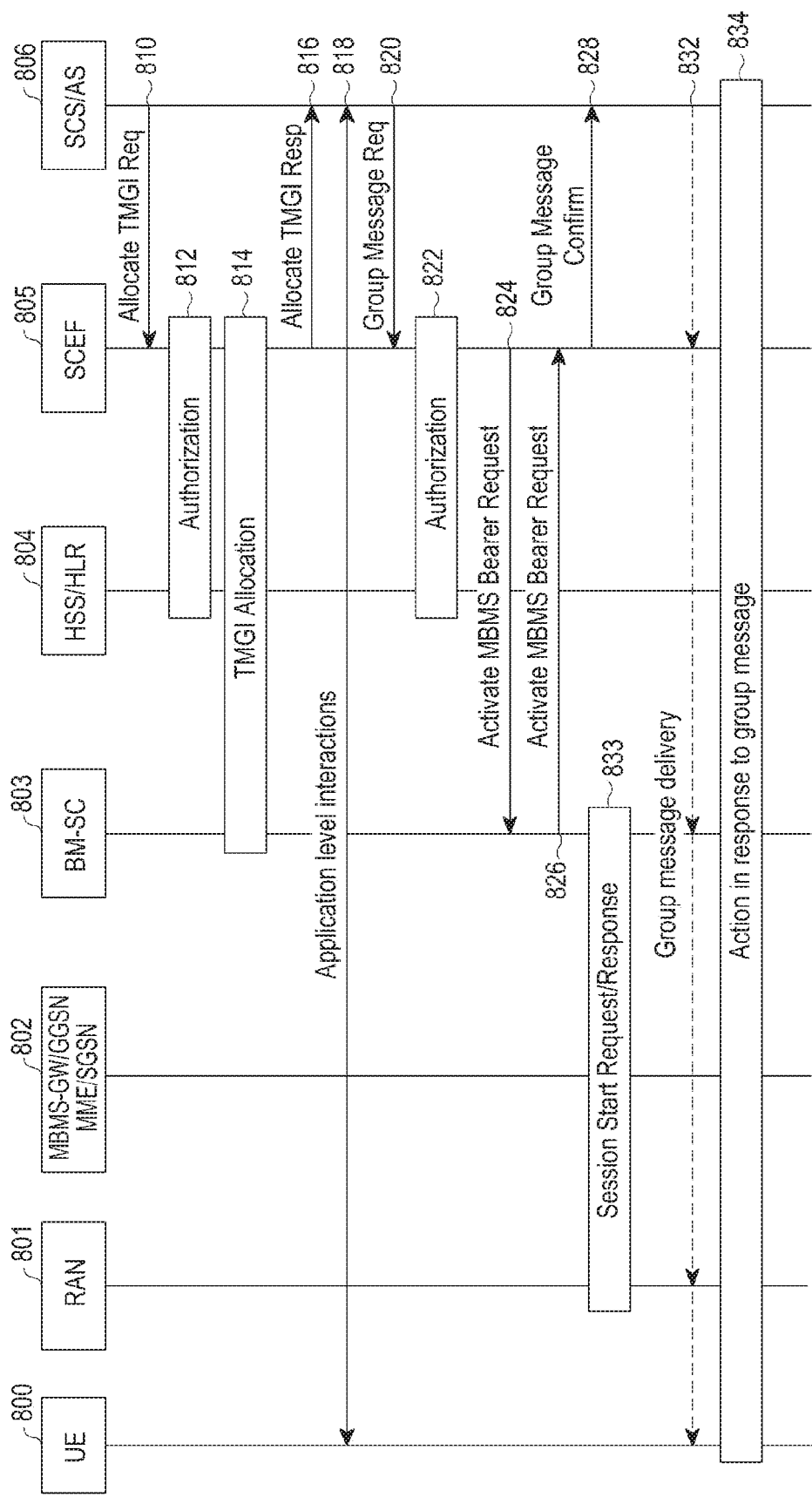
FIG. 8 is a view illustrating an example of another method for transferring a group message using a MBMS.

Described below with reference to FIGS. 7 and 8 are methods and apparatuses for determining a time of transmission according to the type of a group message, i.e., the characteristics of content or distinguishing information contained according to an application signaling time.

FIG. 7 is a view illustrating a method for transferring a group message using a multimedia broadcast multicast service (MBMS).

In FIG. 7, if temporary mobile subscriber identity (TMSI) allocation has already been performed and is still valid, steps 710 to 718 may be omitted. Further, if a MBMS bearer has been activated without TMGI allocation, steps 710 to 718 may be omitted. The TMGI is an identifier for a group receiving MBMS traffic, and the UE may receive MBMS traffic for an allocated TMGI.

If no TMGI has been allocated for the external group ID (which indicates a group identifier used in a 3rd party service or a group of UEs), the SCS/AS 706 sends a TMGI allocation request to the SCEF 705 (710). The request message 710 includes an external group ID and an SCS ID. The SCS/AS 706 may perform DNS query using the external group ID or identify the IP address and port of the SCEF for transmission of user data using a preset SCEF ID/address.

The SCEF 705 performs a permission procedure as to whether the SCS/AS 706 may request to allocate a TMGI or not (712).

The SCEF 705 requests a broadcast multicast service center (BM-SC) 703 to allocate a TMGI (714). This follows the standard, 3GPP TS 23.468.

The SCEF 705 transfers the received TMGI and an expiration time of the TMGI to the SCS/AS 706 (716). The SCEF 705 may cache ID information of the serving BM-SC 703 and TMGI-external group ID mapping.

UEs in a particular group obtain relevant MBMS service information through application level interaction (signaling of application layer) (718). The service information includes a TMGI and MBMS traffic transmission start time.

The SCS/AS 706 transfers a "group message request" message to the SCEF 705 (720). The request message 720 includes an external group ID, an SCS ID, location/area information where a group message is to be sent, a TMGI, or MBMS traffic transmission time. The location/area information may have a type of geographical information.

The SCEF 705 identifies whether the SCS/AS 706 has been permitted to be able to request a group message (722). If the permission process fails, a cause for the failure is transferred to the SCS/AS 706. In this case, the SCS/AS may also release the TMGI allocation accordingly. To that end, it may explicitly request to release the allocation or wait until an expiration time for the TMGI arrives.

The SCEF 705 transmits an "Activate MBMS Bearer" request to the BM-SC 703 (724). The request message 724 may include a MBMS broadcast area which is information about the area where MBMS traffic is to be transmitted, a TMGI, a QoS for MBMS bearer, and a MBMS traffic transmission time.

The BM-SC 703 performs a "Session Start" procedure (726). This may follow the 3GPP TS 23.246 MBMS Session Start procedure.

The MB-SC 703 sends an "Activate MBMS Bearer Response" message to the SCEF 705 (730).

The SCEF 705 sends a "Group message confirm" message to the SCS/AS 706, informing whether the request for transmission of the group message has been permitted (732). The message 732 may include the TMGI received in step 730, the MBMS broadcast area, radio frequency, and the SCEP's IP address or port (or BM-SC's IP address and port) for data transmission.

The SCS/AS 706 may provide MBMS service information related to UEs belonging to a particular group through an application level interaction (734). The service information may include the TMGI, the MBMS broadcast area received in step 11, radio frequency, and MBMS traffic transmission start time.

At or after the time of transmission of MBMS traffic exchanged through the above procedure and before the valid time for the TMGI expires, the SCS/AS 706 transfers content for the group to the SCEF 705 at the IP address or port of the SCEF received in step 732. The SCEF 705 transfers the content received at the IP address or port through a MB2-U interface to the BM-SC 703. At this time, it uses the IP address and port received in step 730. The BM-SC 703 broadcasts the received content to the UEs (736).

In response to the content (group message) received in MBMS, the UE may, immediately or later, transmit the response to the SCS/AS 706 (738).

FIG. 8 is a view illustrating an example of another method for transferring a group message using a MBMS.

In FIG. 8, if a TMS allocation has already been performed and is still valid, steps 810 to 818 may be omitted. Further, if a MBMS bearer has been activated without TMGI allocation, steps 810 to 818 may be omitted. The TMGI is an identifier for a group receiving MBMS traffic, and the UE may receive MBMS traffic for an allocated TMGI.

If no TMGI has been allocated for the external group ID, the SCS/AS 806 sends a TMGI allocation request to the SCEF 805 (810). The message 810 may include an external group ID and an SCS ID. The SCS/AS 806 may perform domain name server (DNS) query using the external group ID or identify the IP address and port of the SCEF for transmission of user data using a preset SCEF ID/address.

The SCEF 805 performs a permission procedure as to whether the SCS/AS 806 may request to allocate a TMGI or not (812).

The SCEF 805 requests a BM-SC 803 to allocate a TMGI (814). This may follow the standard, 3GPP TS 23.468.

The SCEF 805 transfers the received TMGI and an expiration time of the TMGI to the SCS/AS 806 (816). The SCEF 805 may cache ID information of the serving BM-SC 803 and TMGI-external group ID mapping.

UEs in a particular group obtain relevant MBMS service information through application level interaction (signaling of application layer) (818). The service information includes a TMGI and MBMS traffic transmission start time.

The SCS/AS 806 transfers a "group message request" message to the SCEF 805 (820). The message 820 includes an external group ID, an SCS ID, location/area information where a group message is to be sent, a TMGI, or MBMS traffic transmission start time. The location/area information may have a type of geographical information.

The SCEF 805 identifies whether the SCS/AS 806 has been permitted to be able to request a group message (822). If the permission process fails, a cause for the failure is transferred to the SCS/AS. In this case, the SCS/AS may also release the TMGI allocation accordingly. To that end, it may explicitly request to release the allocation or wait until an expiration time for the TMGI arrives.

The SCEF transmits an "Activate MBMS Bearer" request to the BM-SC (824). The message may include a MBMS broadcast area which is information about the area where MBMS traffic is to be transmitted, a TMGI, a QoS for MBMS bearer, and a MBMS traffic transmission start time.

The MB-SC 803 sends an "Activate MBMS Bearer Response" message to the SCEF 805 (826).

The SCEF sends a "Group message confirm" message to the SCS/AS, informing whether the request for transmission of the group message has been permitted (828). The message may include at least one of a TMGI, a radio frequency, and a MBMS service area identity (SAI) as well as the transmission start time received in step 826. Here, an application level interaction may be carried out between the UE and an application server of a particular group for looking up MBMS service information such as the MBMS SAI, radio frequency, and TMGI. However, since a "Session start" procedure of the BM-SC 803 has not yet been performed, the application server cannot be aware of the MBMS broadcast area in the application level interaction step and may not thus broadcast MBMS traffic.

Now, the BM-SC performs a "Session Start" procedure (830). This may follow the 3GPP TS 23.246 MBMS Session Start procedure.

At or after the MBMS traffic transmission start time exchanged through the Session start procedure and before the valid time for the TMGI expires, the application server (SCS/AS) transfers a content (i.e., group message) for group to the SCEF. The SCEF transmits the content to the BM-SC through a MB2-U interface using the IP address and port received in step 826. The BM-SC transmits (broadcasts) the content to the UE (832).

In order to prevent substantially simultaneous transmission of potential responses from a number of devices in response to the content broadcast, the application server (SCS/AS), upon expecting that the UE will respond to the content, may enable the UE to receive a respond time window.

In response to the content (group message) received in MBMS, the UE may, immediately or later, transmit the response to the SCS/AS (834).

Figure 9:
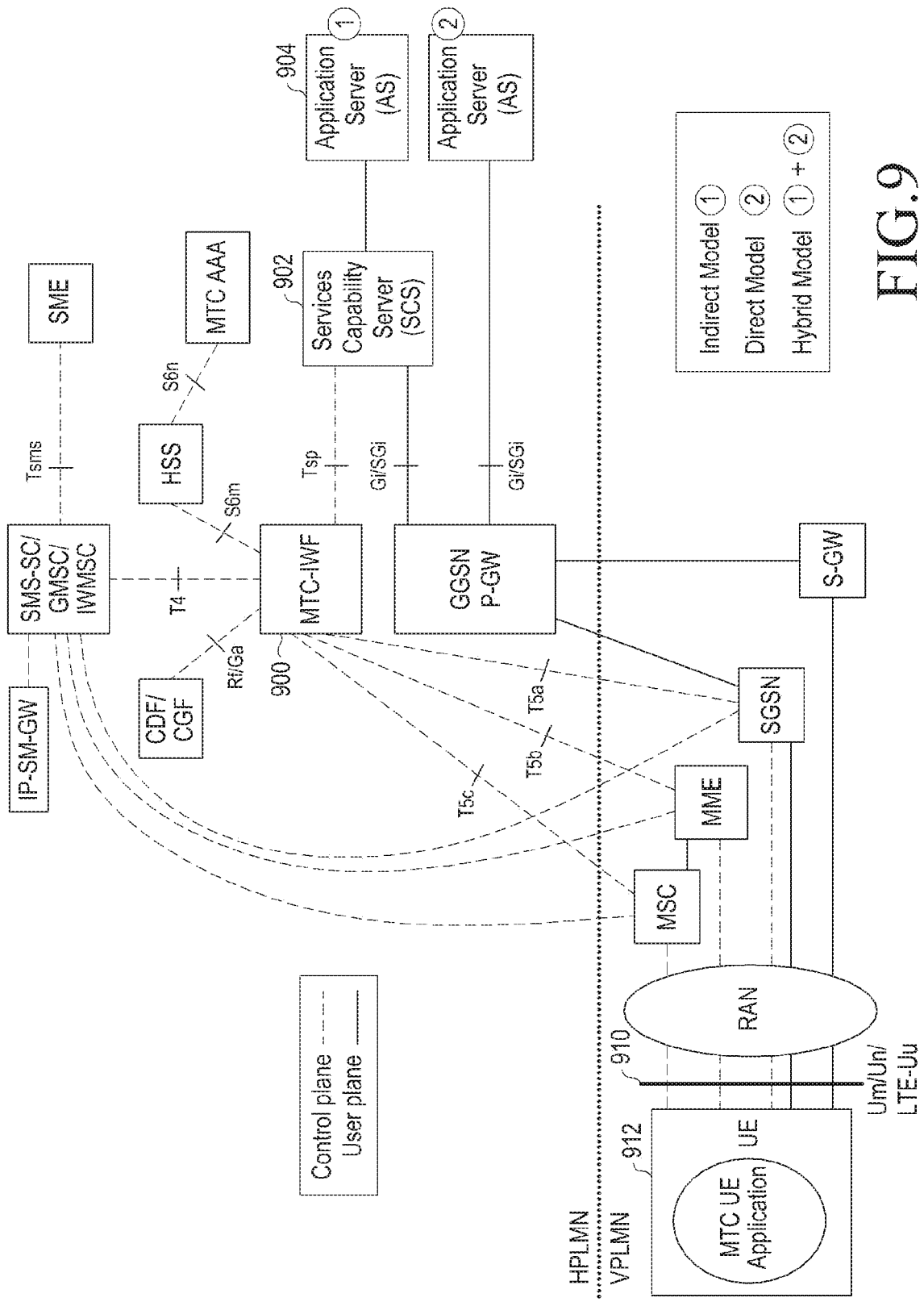
FIG. 9 is a view illustrating a mobile communication network architecture of a UE for a MTC.
Figure 10:
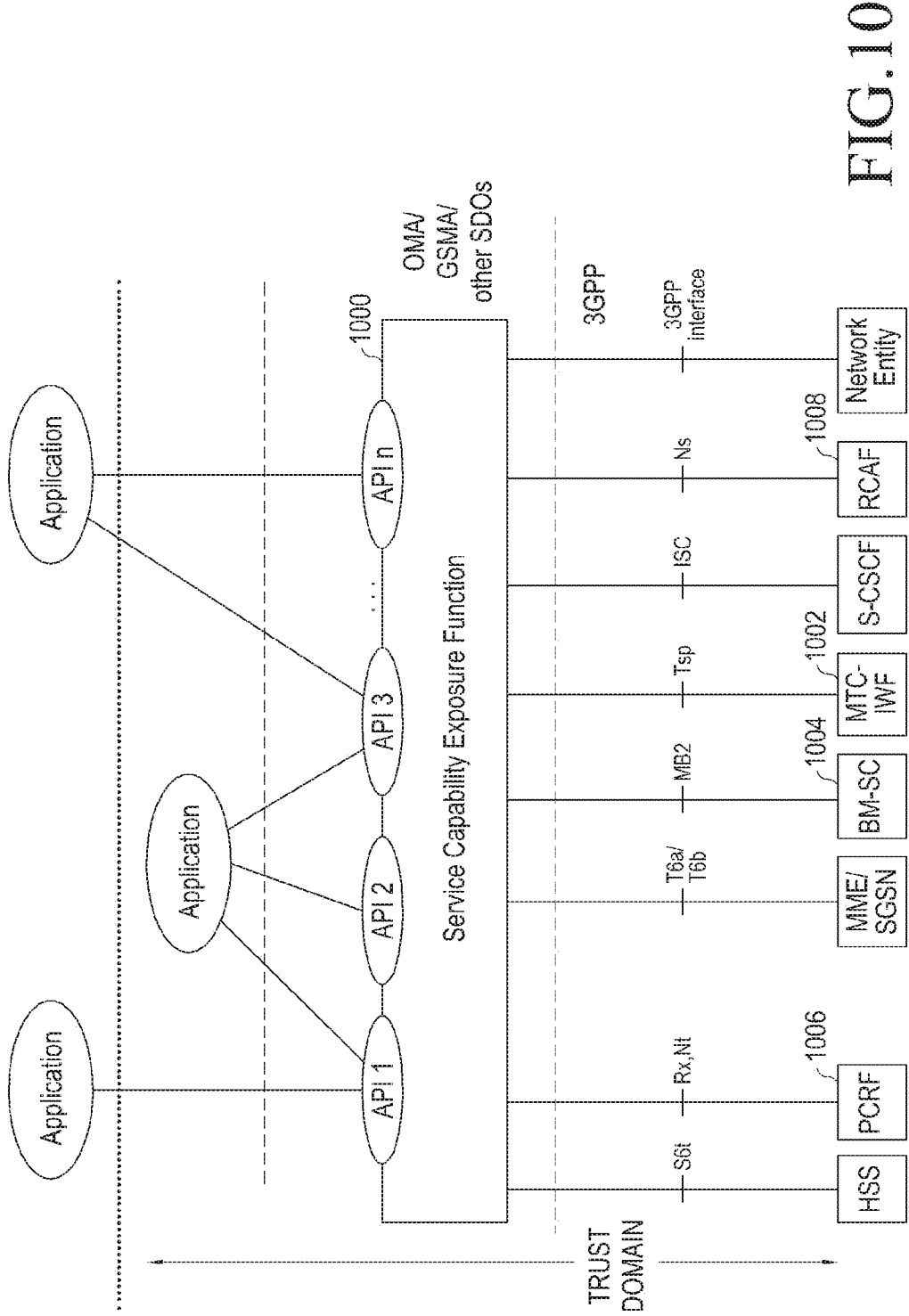
FIG. 10 is a view illustrating a 3GPP architecture for an SCE.
Figure 11:
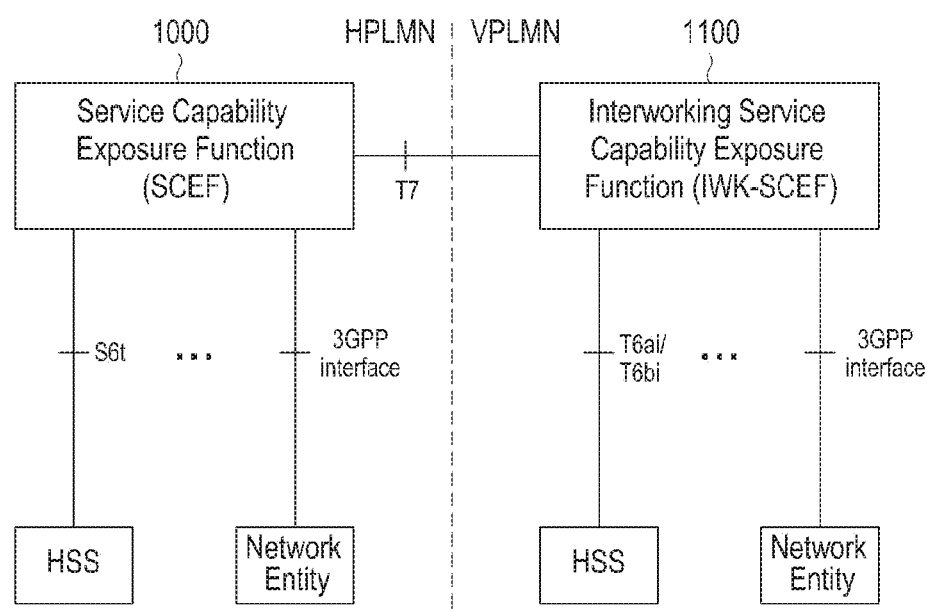
FIG. 11 is a view illustrating a 3GPP roaming architecture for an SCE.

Further, according to the present disclosure, there are described methods and apparatuses for obtaining routing information of entities in a roaming network with reference to FIGS. 9 to 11.

FIG. 9 is a view illustrating a mobile communication network architecture of a UE for a MTC.

In FIG. 9, the mobile communication network may be a network, e.g., a UTRAN, an E-UTRAN, or a GERAN, and a UE 912 may connect to the mobile communication network through, e.g., a Um/Uu/LTE-Uu interface 910. A MTC-inter working function (IWF) 900 in the architecture may perform a service capability exposure (SCE) function and may thus be called an SCEF. The MTC-IWF 900 may be connected to a service capability server (SCS) 902 and an application server (AS) 904 through a Tsp interface.

FIG. 10 is a view illustrating a 3GPP architecture for an SCE.

Although in FIG. 10 the MTC-IWF 1002 has been shown as an entity separate from the SCEF 1000 for ease of description, it has been described above that they may be implemented as a single entity. The SCEF 1000 may securely expose a service and capability that a 3GPP network may provide to an external 3rd party service provider application. In FIG. 10, example interfaces connecting the SCEF with other entities are shown. For example, the SCEF may be connected with the BM-SC through a MB2 interface.

FIG. 11 is a view illustrating a 3GPP roaming architecture for an SCE.

In FIG. 11, an HPLMN has an SCEF 1000, and a visited PLMN (VPLMN) has an IWK-SCEF 1100.

The SCEF 1000 may be connected to a serving PLMN. Whether the serving PLMN is an HPLM or VPLMN may be determined depending on settings by the mobile communication service provider.

The SCEF 1000 should be aware of a serving PLMN ID to determine a MB2 interface (which is an interface between the SCEF and the BM-SC). The SCS/AS may obtain the serving PLMN ID from the UE through application level signaling, and the serving PLMN ID may be transferred from the SCS/AS to the SCEF 1100.

Referring to FIGS. 10 and 11, if the UE is roaming, the SCEF 1000 may additionally request the UE's HPLMN ID and IP address to determine a Rx interface and Nt interface, as interfaces between the SCEF 1000 and the PCRF 1006. The SCEF 1000 has an IP address range and a setting for PLMN information corresponding thereto, and thus, it may identify which PLMN the UE having a particular IP address spectrum belongs to. The SCS/AS may obtain the UE's serving PLMN ID, and additionally the HPLMN ID and UE's IP address, from the UE through application level signaling and may then transfer them to the SCEF. Similarly, in order to determine a Ns interface which is an interface between the SCEF 1000 and the RAN congestion awareness function (RCAF) 1008, the SCEF 1000 may additionally request the UE's HPLMN ID and IP address.

Figure 12:
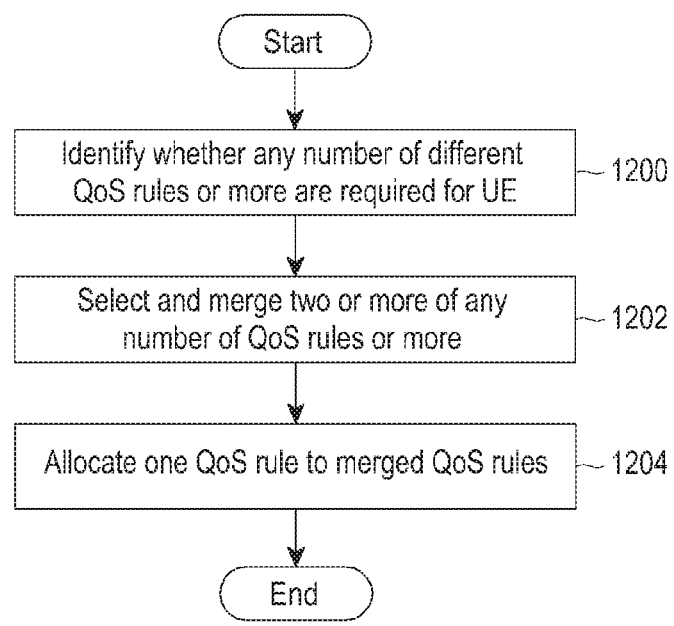
FIG. 12 is a view illustrating a method for a PCRF to bind a MCPTT-related service data flow to a bearer according to the present disclosure.

Now described with reference to FIG. 12 are methods and apparatuses for merging or separating network bearers of MCPTT-related services.

The maximum number of unacknowledged mode (UM) data radio bearers (DRBs) permitted to the UE is defined to be three. Accordingly, a bearer modification requested by the UE using mission critical push to talk over LTE (MCPTT) may be rejected, and the rejection of modification may cause an interruption of distress network service.

If the UE uses all of voice over LTE (VoLTE), mission critical video over LTE (MCVideo), and MCPTT call, the UE resultantly uses all of the three UM DRBs. At this time, if a MCPTT server starts a MCPTT emergency call, a bearer request for the MCPTT emergency call would fail.

There has been suggested a solution that uses two services for one bearer having a QoS class identifier (QCI) and allocation and retention priority (ARP).

In this solution, the MCPTT server, upon requesting resources for a service data flow (SDF), includes a priority sharing identity (ID), and the PCRF adjusts the ARP of service data flows (SDFs) having the same priority sharing ID for one bearer, allowing an SDF corresponding to the ARP of a higher priority to use the bearer.

In this disclosure, it is assumed that the SDFs are mapped to the UM DRBs, respectively, and are delivered through the mapped DRBs. Here, there may be a plurality of SDFs having the same QCI in one bearer. That is, a bearer may provide a data transmission service for the SDFs having the same QCI. ARP values may differ among the SDFs of the bearer. The ARP is a parameter used to determine whether to generate a new bearer after deleting the existing bearer or reject the generation of the new bearer when a new bearer should be generated where the LTE network has insufficient resources. Different ARPs in the bearer may be applicable to the determination of an SDF to be serviced.

However, this solution does not cover the circumstance where there are several MCPTT servers. Further, if every resource request includes the priority sharing ID, the resource requests sent from several MCPTT servers to the PCRF should be applicable as one bearer, and thus, the PCRF cannot perform control so that the ARPs of the SDFs differ from each other. This is why, when emergency calls come in two or more MCPTT services, which MCPTT service of emergency call the priority should be given to cannot be known. Accordingly, a group communication service identity (GCS-ID) which is an identifier indicating a MCPTT service, instead of the priority sharing ID, may be used.

FIG. 12 is a view illustrating a method for a PCRF to bind a MCPTT-related service data flow to a bearer according to the present disclosure.

The PCRF identifies that a bearer having three different QoS rules is required for the UE (1200). Where the QoS rules differ includes where QCIs are the same but ARPs differ. Here, the condition of being three corresponds to the maximum number of UM DRBs supported between eNB and UE, but not limited thereto. The SDF of the bearer having different QoS rules cannot be preempted by another SDF and is mapped with the UM DRB. When a bear having a particular QoS rule other than the three rules is additionally requested, the PCRF may perform the following procedure.

Information about a particular QoS rule that cannot be preempted and should be mapped to the UM DRB has been set in the PCRF. (e.g., such setting is made that a QoS rule having QCI 1, 65, and 70 cannot be preempted by other SDFs, and each SDF is UM DRB mapped)

The PCRF selects two or more QoS rules among the QoS rules in step 1 and merges them by the following procedure (1202).

It selects QoS rules having the same QCI value (ARPs may differ).

Since there may be three or more QoS rules, and QoS rules having the same QCI are selected, at least two QoS rules have the same QCI. Accordingly, the QoS rules not preempted and mapped to UM DRB cannot have three or more QCI values.

The PCRF allocates one QoS rule to the QoS rule selected in step 2 (1204).

At this time, the PCRF may use the common QCI value (i.e., the common QCI of the QoS rules selected in step 2) as the QCI value of the one QoS value.

The PCRF sets the QoS rule of the highest ARP value among the selected QoS rules as the one QoS rule.

The PCRF may apply the priority sharing ID to the bearer to which the QoS rule applies.

The PCRF provides a QoS rule modified by the procedure to the P-GW.

The step 1-3 may be applied only to the SDF corresponding to the indication (e.g., priority sharing ID and/or GCS-ID) transferred by the P-CSCF.

The PCRF may also make such a setting as to perform the above operation by the P-GW. In other words, the P-GW receiving a policy and charging control (PCC) rule may perform the above-described operation per bearer (rather than per SDF). Here, the indication (e.g., priority sharing ID and/or GCS ID) may be transferred to the P-GW.

Hereinafter, methods and apparatuses for restoring the connection of a user plane gateway separated are described with reference to FIGS. 13 to 15.

In this disclosure, user plane data and control plane data sent from a UE are distinguished from each other. The user plane data means traffic data related to an application used by a UE while the UE uses an Internet service or IoT service, and the user plane data means data containing control information communicated with entities by a UE to use a network.

The S-GW or P-GW may have both a control plane function and user plane function in one node.

However, for more efficient network resource utilization and higher service quality, such functions may be provided with the control plane and user plane of gateway distinguished from each other.

Figure 13:
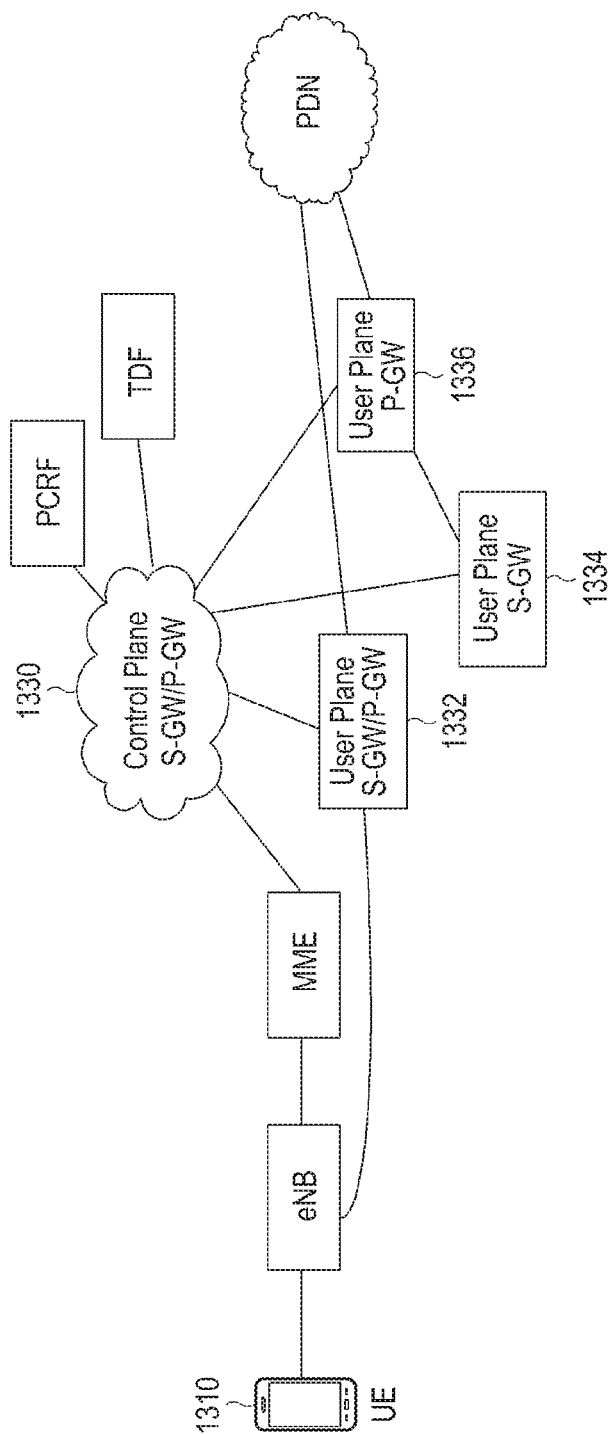
FIG. 13 is a view illustrating a system structure in which a control plane function and user plane function of an S-GW and a P-GW are separated.

FIG. 13 is a view illustrating a system structure in which a control plane function and user plane function of an S-GW and a P-GW are separated.

The control plane function and user plane function of S-GW or P-GW are separated and are respectively arranged in separated nodes, and the GW having the control plane function is virtualized and implemented as a centralized node. The control plane GW may be left as one centralized node 1300, and several user plane GWs 1302, 1304, and 1306 may be arranged near the user. The control plane GW 1300 may connect itself to the user plane GWs to provide such functions as those provided by the existing GWs as they are.

The centralized node 1300 is in charge of controlling UEs, and the several user plane GWs 1302, 1304, and 1306 separated are in charge of transmission/reception of UE user plane data, thereby allowing for efficient network resource utilization. Since the user data of the UE 1310 is transmitted/received through the user plane gateway positioned nearby, routing delay may be reduced, and quicker data transmission/reception may be possible.

From a point of view of network management when a failure occurs, since the control plane function is maintained even through the user plane function fails, the failure may be addressed by placing a user plane GW having a different user plane function. As such, efficiency may be obtained also in light of network management. This is called control plane user plane separation (CUPS).

According to the present disclosure, there are proposed methods and apparatuses for restoring a GW connection when the user plane GW encounters a failure in cases where the control plane GW and the user plane GW are separated from each other.

In this disclosure, the control plane user plane separation technique is referred to as CUPS for convenience. Further, the control plane GW may be distinctively called a control plane S-GW or control plane P-GW. The control plane S-GW and the control plane P-GW respectively are referred to as CP S-GW and CP P-GW. The user plane S-GW and the user plane P-GW respectively are referred to as UP S-GW and UP P-GW.

Where a congestion or failure occurs in the UP GW, there is a need for allocating a new UP GW to change the user plane path so as to continuously provide data transmission/reception services to the UE. Where a congestion/failure occurs in the UP GW, one case where the failure occurs in the UP S-GW occurs and another case where the failure occurs in the UP P-GW occurs may separately be taken into account.

Where a congestion/failure occurs in the UP S-GW, the CP S-GW may select a new UP S-GW. The CP S-GW may allocate an S1 tunneling endpoint ID (TEID) and S5 TEID of the new UP S-GW. S1 is an interface between eNB and S-GW, and S5 is an interface between S-GW and P-GW. The CP S-GW transfers an access point name being used, EPS bearer ID, S1 TEID, S5 TEID, QCI, and ARP value to the UP S-GW. As all the other information than the TEID, existing information about the service being provided to the UE may be used as it is. The CP S-GW may transfer the changed UP S-GW information to the MVIE. Here, a "Create Bearer request" message or "Update Bearer request" message may be reused. The MME may identify the EPS bearer ID present in the bearer context of the received message to recognize that the S-GW has been changed for the existing connection.

Where a congestion/failure occurs in the UP P-GW, the same method as in the case where a congestion/failure occurs in the UP S-GW may apply. That is, the above-described method may be likewise applied by replacing the S-GW with the P-GW. However, since replacing with the P-GW allows for use of the new PCC rule, a method in which the PCC provided to the UE is updated may be further included.

Figure 14:
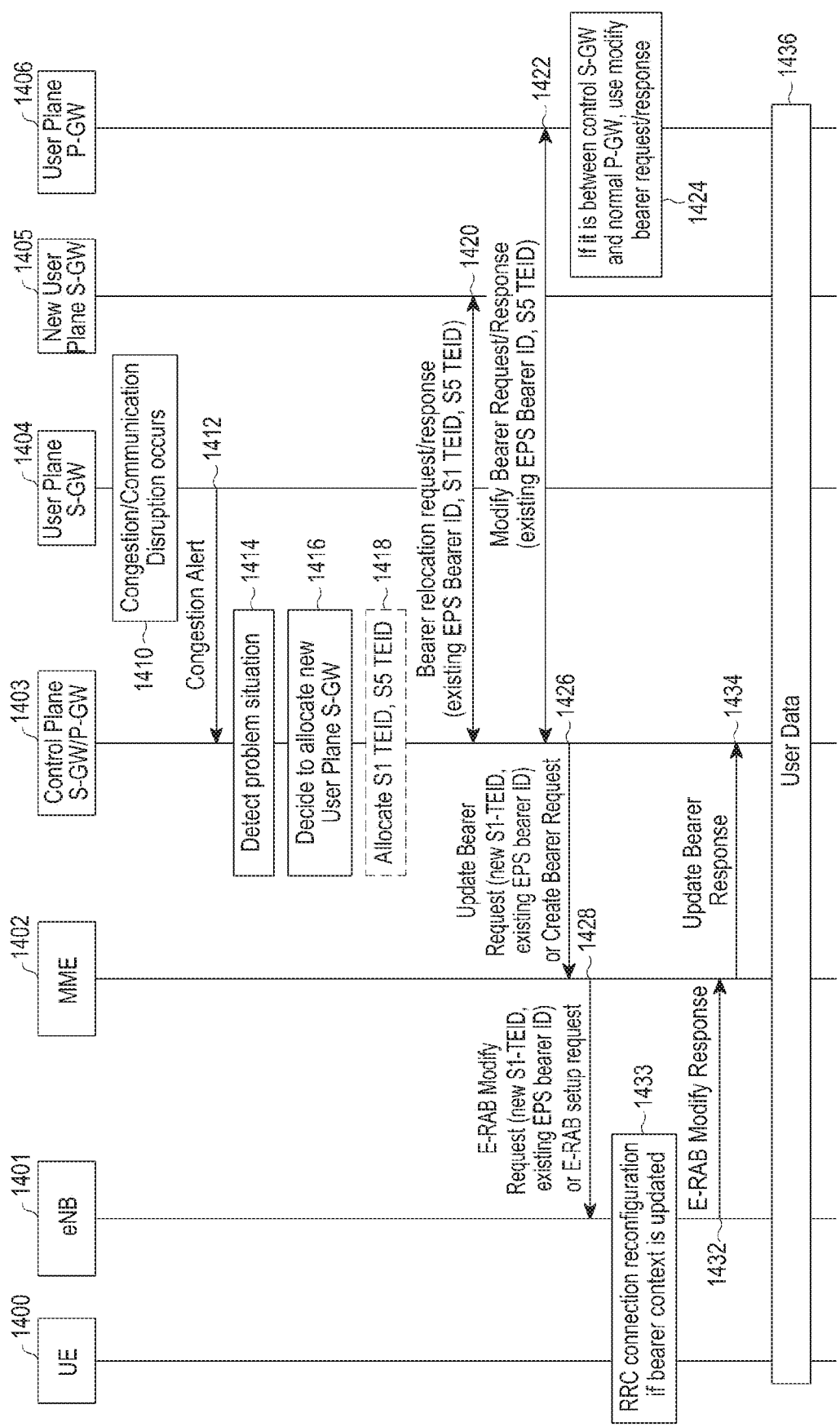
FIG. 14 is a view illustrating an example of a user plane restoration procedure when an S-GW encounters a failure.

FIG. 14 is a view illustrating an example of a user plane restoration procedure when an S-GW encounters a failure.

Where a congestion/failure occurs in the UP S-GW 1404 (1410), the UP S-GW 1404 notifies the CP S-GW 1403 of the occurrence of the congestion or failure (1412). The CP S-GW 1403 may be an entity co-located with the CP P-GW.

The UP S-GW 1404 recognizes a problematic situation (1414), and the CP S-GW 1403 determines to allocate a new UP S-GW 1405 (1416).

The CP S-GW 1403 allocates a new UP S-GW 1405 (1418). Specifically, the CP S-GW 1403 allocates an S1 TEID and S5 TEID of the new UP S-GW 1405.

The CP S-GW 1403 transfers the user plane bearer path that the user has used to the new UP S-GW 1405 (1420). The bearer path information may be transferred through a "Bearer relocation request" message. The message 1420 includes the EPS bearer ID that the UE is currently using and the S1 TEID and S5 TEID that the UP S-GW 1405 is to use. The UP S-GW 1405 may send a response to the CP S-GW 1403.

The CP S-GW 1403 sends a "Modify bearer request" to the UP S-GW 1405, informing that the UP S-GW has changed (1422). If the UP P-GW is co-located with the UP S-GW, the UP S-GW may internally be processed even without the 1422 message. The "Modify Bearer request" 1422 includes the EPS bearer that the user is currently using and the S5 TEID for connection with the UP S-GW. The UP P-GW sends a response. Even a normal P-GW, not the UP P-GW, may also use the "Modify bearer request."

Since a connection has been set up between the UP S-GW 1405 and the UP P-GW 1406, the CP S-GW 1403 sends an "Update Bearer request" or "Create bearer request" to the MME 1402 to connect the eNB with the UP S-GW. The message 1426 includes the S1 TEID to be used with the newly allocated UP S-GW and the EPS bearer ID that the UE is using.

The MME 1402 receives the information 1426 and sends an "E-RAB modify request" to the eNB 1401 (1428). The S1 TEID to be used with the newly allocated UP S-GW and the EPS bearer ID that the UE is using may be provided in the message 1428. The "E-RAB modify request" is generally used to update QoS. Accordingly, there should be included a NAS message transferred up to the UE. As in this disclosure, the "E-RAB modify request" may be set, with the NAS message omitted or filled with 0, in order to inform that it is the "E-RAB modify request" generated due to the UP restoration. Since this may be interpreted as there being no QoS update-related message to be transferred to the UE, the eNB 1401 updates the connection information with the UP S-GW 1405 and continuously provides service without interaction with the UE.

If the bearer context has been updated, the "E-RAB modify request" message would have a NAS message. The eNB 1401 may send the NAS message to the UE 1400 and may apply the updated bearer context through a RRC connection reconfiguration procedure (1430).

The MME 1402 may use a new message rather than using the "E-RAB modify request" message. The new message is a message used to change the user plane path and does not require a variation in, e.g., bearer QoS. This is a message for reconfiguring only the path between the eNB and the UP S-GW, and this message may include the S1 TEID necessary for connecting with the newly allocated UP S-GW and the existing EPS bearer and the S1 AP UE ID for identifying the UE between the MME and the eNB.

The eNB and the MME send a response to each request, terminating the procedure (1432 and 1434).

The UE 1400 may transmit/receive data through the modified user plane path (1436).

Figure 15:
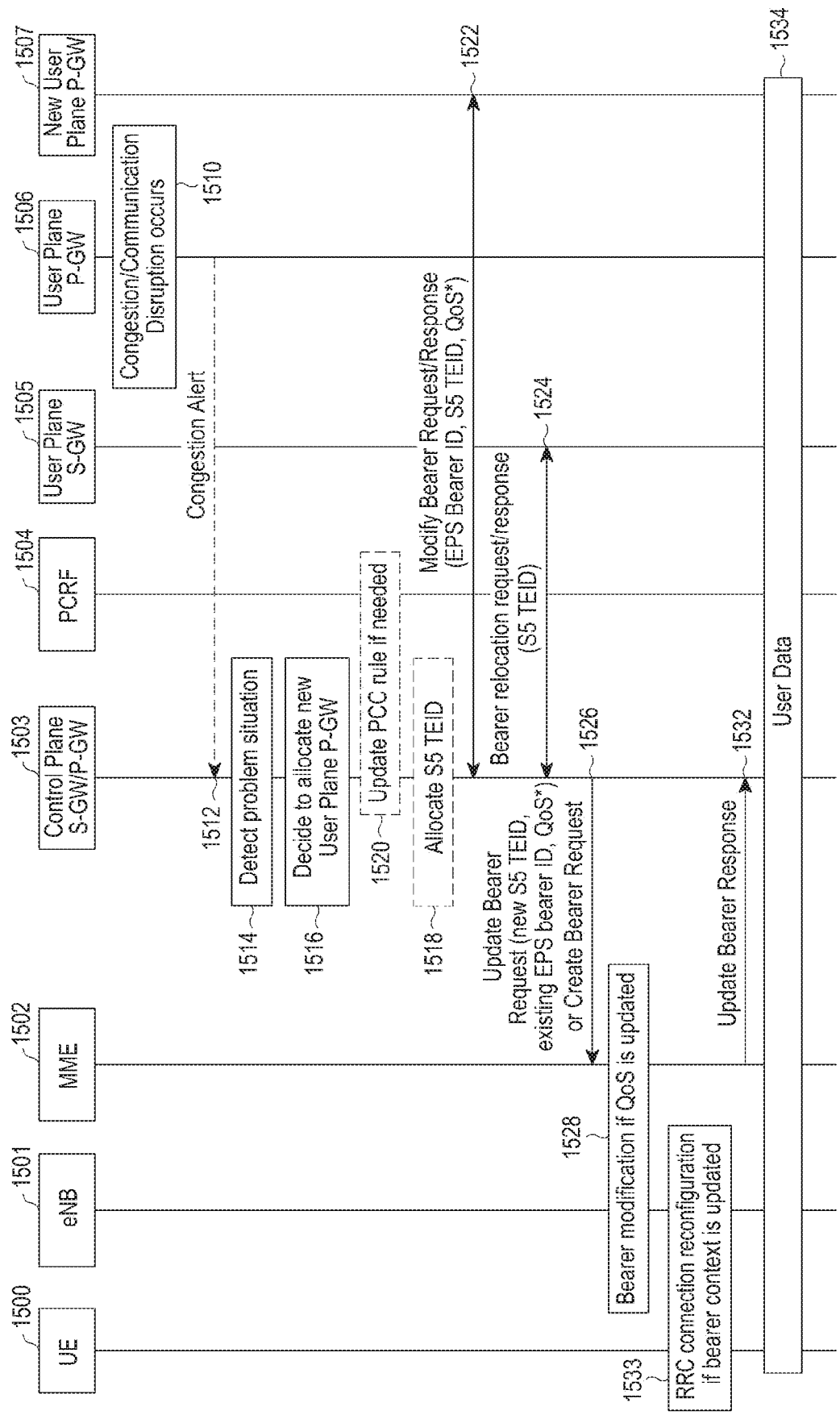
FIG. 15 is a view illustrating an example of a user plane restoration procedure when a P-GW encounters a failure.

FIG. 15 is a view illustrating an example of a user plane restoration procedure when a P-GW encounters a failure.

Where a congestion/failure occurs in the UP P-GW 1506 (1510), the UP P-GW 1506 notifies the CP P-GW 1503 of the occurrence of the congestion or failure (1512). The CP P-GW 1503 may be an entity co-located with the CP S-GW.

The UP P-GW 1404 recognizes a problematic situation (1514), and the CP P-GW 1503 determines to allocate a new UP P-GW 1507 (1516).

The CP P-GW allocates a new UP P-GW 1507. The CP P-GW allocates a new UP P-GW 1507. Here, the CP P-GW 1503 may negotiate with the PCRF 1504 to identify whether the PCC rule to be applied to the new UP P-GW needs to be updated. In case the PCRF determines that the PCC rule needs to be updated, it transfers the updated PCC rule to the CP P-GW, and the CP P-GW includes QoS information updated as per the updated PCC rule in subsequent procedures (1520).

The CP P-GW 1403 transfers the user plane bearer path that the user has used to the new UP P-GW 1405 (1522). The bearer path information may be transferred or received through a "Modify Bearer Request/Response" message. The message 1522 includes the EPS bearer ID that the UE is currently using and the S5 TEID that the UP P-GW is to use.

In case the PCC rule is updated in step 1522, the modified QoS value is included. The UP P-GW may send a response.

The CP P-GW sends a Modify bearer request to the CP S-GW, informing that the UP P-GW has been modified. As shown in FIG. 15, if the CP P-GW 1503 is co-located with the CP S-GW, it may be internally processed. The "Modify Bearer request" includes the EPS bearer that the user is currently using and the S5 TEID for connection with the UP P-GW. If the PCC rule is updated in step 1520, it is sent together with the modified QoS information. The CP S-GW sends a response.

Thereafter, the CP S-GW informs the UP S-GW that the information that should be connected to the UP P-GW has been modified (1524). For example, the modification to the connection information may be known through a "Bearer relocation request" message. The message 1524 includes S5 TEID information for connection with the newly allocated UP P-GW. If there is updated QoS, QoS information is also sent. The UP S-GW responds to the 1524 message.

Since the connection between the UP S-GW and the UP P-GW has been newly set up, the CP S-GW sends an "Update Bearer request" or "Create bearer request" to the MME 1502 to inform the MME of the information about the newly allocated UP P-GW (1526). The message includes the S1 TEID to be used with the newly allocated UP S-GW and the EPS bearer ID that the UE is using. In case QoS information is modified, the modified QoS message is included in an "Update bearer request." The MME receives the information and stores the S5 TEID of the newly allocated UP P-GW. In case the QoS information is modified, the modified QoS information is stored.

In case the QoS is updated, the MME transmits an "E-RAB modify request" to the eNB, performing a bearer modification procedure (1528).

The eNB performs a bearer update procedure with the UE (1530).

The eNB and the MME send a response to each request, terminating the procedure (1532).

The UE may transmit/receive data through the modified user plane path (1534).

Hereinafter, methods and apparatuses for selecting a user plane gateway separated are described with reference to FIGS. 16 and 17.

According to the present disclosure, there are proposed a method for selecting a user plane GW in a case where a control plane GW and user plane GW are separated, a method for indicating whether a GW connected with a MME supports control plane user plane separation, and a context exchange procedure between MMEs as per the methods.

The control plane GW should select a suitable user plane GW to provide a data service to the UE. Basically, the location of the UE, i.e., the tracking area identity (TAI) or E-UTRAN cell global identifier (ECGI) (a cell ID in the LTE system) may be considered.

According to the present disclosure, there is also considered a method for considering the mobility of UE. The MME receives a last visited registered TAI from the UE. The MME may provide collected data to the control plane GW, determining from which area to which area the UE moves and a next area to be predicted. This would be useful especially for high-mobility UEs. The control plane GW allocates a user plane S-GW/P-GW to the UE according to the TAI map that it has. The S-GW/P-GW may be co-located.

In case the MME managing the UE changes into a new one, the new MME receives the UE's context and GW connection information from the existing MME. In case the existing MME connects with the GW performing control plane user plane separation function, it should receive the respective addresses of the control plane GW and the user plane GW. Accordingly, the new MME should be able to grasp whether the existing MME connects with the GW having the control plane user plane separation function.

According to the present disclosure, there is proposed a method of determining whether or not a MME is a MME connected to a GW having a control plane user plane separation function by looking at a MME Group Identifier (MMEGI), which is a part of a Globally Unique Temporary Identifier (GUTI) which is a temporary ID allocated to the UE by the MME. According to the present disclosure, there is also proposed a method of receiving a response by inquiring about each of the control plane GW address and user plane GW address upon requesting context if the existing MME is a MME connected with the GW having a control plane user plane separation function.

Figure 16:
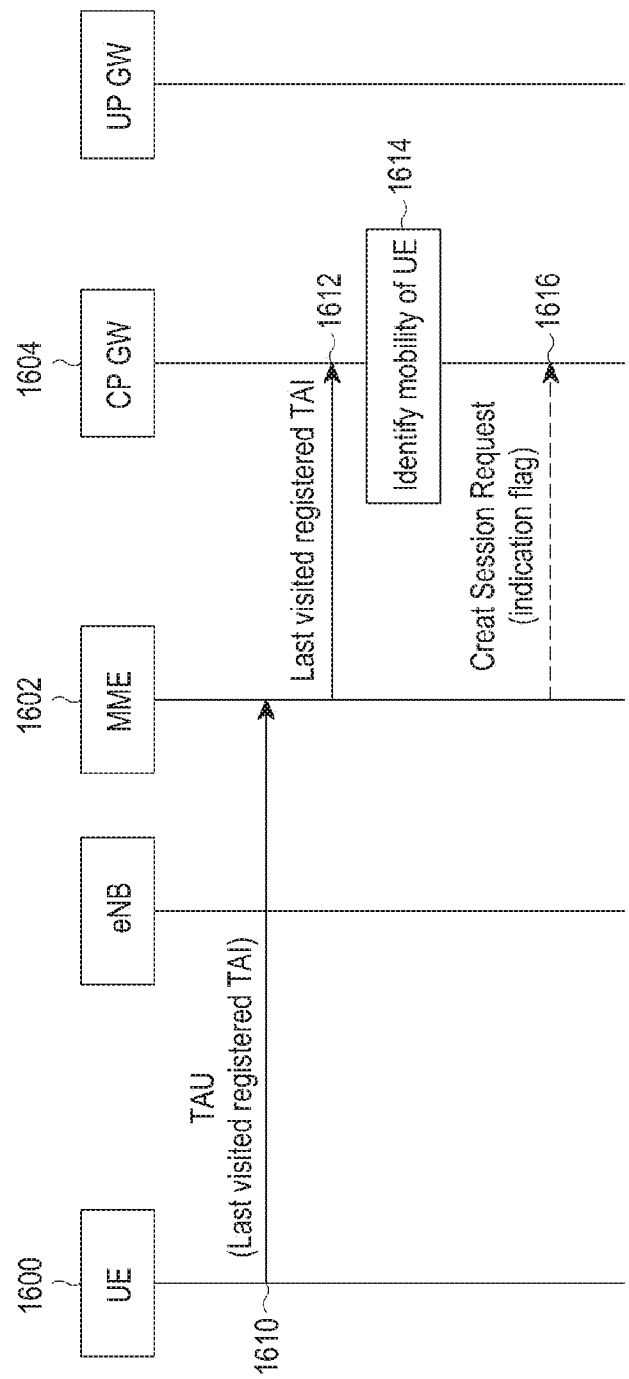
FIG. 16 is a view illustrating a procedure of transferring information for UP GW selection.

FIG. 16 is a view illustrating a procedure of transferring information for UP GW selection.

Referring to FIG. 16, references for selecting a UP S-GW and UP P-GW are described.

The MME 1602 and the S-GW/P-GW share the ECGI (cell ID) of the cell where the UE camps. When the UE 15600 connects to the MME 1602 to perform a mobility management procedure, it transfers an ECGI and TAI, and when the MME 1602 sets up a bearer with the S-GW/P-GW, it gives relevant information.

The MME 1602, when the UE 1600 sends a tracking area update (TAU), receives a last visited registered TAI from the UE (1610). The last visited registered TAI is information indicating the TAI of where the UE has camped before, and MME may collect the last visited registered TAI to determine from which TAI of area to which TAI of area the UE is moving. In particular, the last visited registered TAI may be information meaningful only to fast moving UEs. This is why it is possible to determine from which area to which area the UE is moving, how frequent the UE moves, and in what direction the UE moves through the last visited registered TAI.

The MME 1602 may transfer the last visited registered TAI to the CP GW in order to help the CP GW 1604 to select a UP S-GW/UP P-GW (1612).

Having received the last visited registered TAI from the MME, the CP GW may identify from which area to which area the UE moves using a configured TAI map (1614). Accordingly, the CP GW may predict the mobility and directivity of the UE to allocate an optimal UP GW to the corresponding location. The CP GW may separately allocate a UP S-GW and UP P-GW or may select a UP GW where a UP S-GW and UP P-GW are implemented in a single node.

Or, alternatively, the MME 1602 may inform the CP GW 1604 that a new UP GW needs to be selected. The MME transfers a "Create Session Request" message to the S-GW, setting up a bearer. Accordingly, the MME may transfer the "Create Session Request" message to the CP AGW, informing that a UP GW needs to be newly selected to set up a bearer (1616). In order to inform that a UP GW needs to be selected, the MME may use an information element (IE), called an indication flag, which is capable of indicating reselection or relocation of UP GW in the "Create Session request" message.

Figure 17:
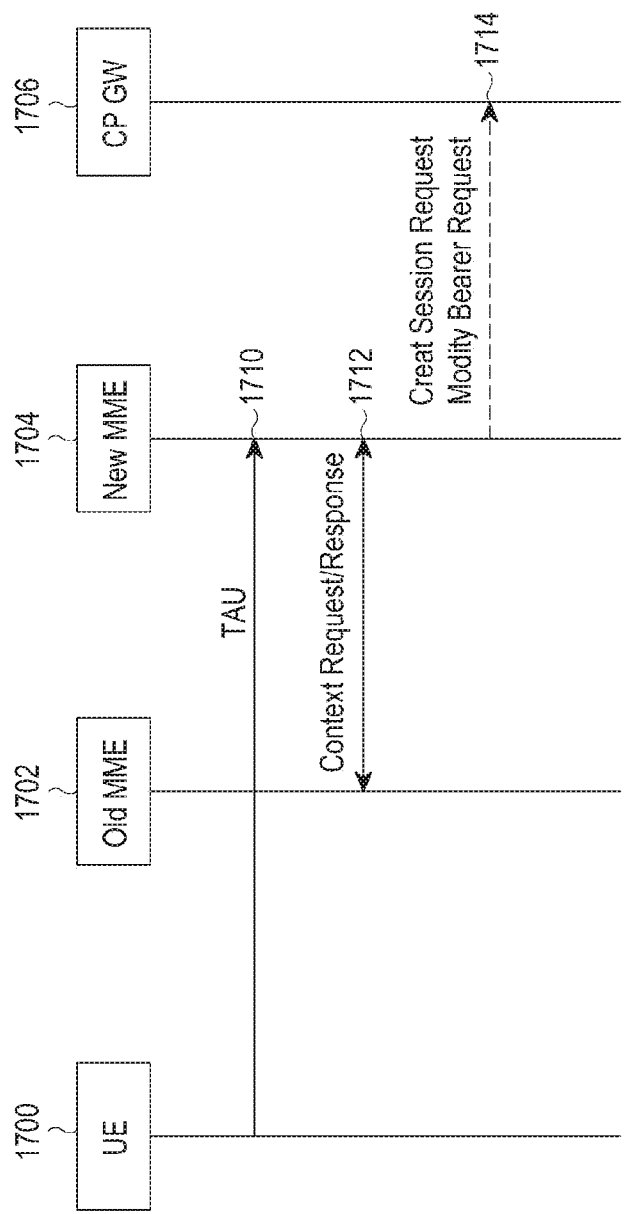
FIG. 17 is a view illustrating a method of identifying whether a MME is a CUPS use MME and a procedure of requesting CP GW and UP GW connection information.

FIG. 17 is a view illustrating a method of identifying whether a MME is a CUPS use MME and a procedure of requesting CP GW and UP GW connection information.

The MME managing the UE may be changed according to the location where the UE 1700 moves. If the UE moves within the TAI list provided from the MME managing the UE and then moves to a TAI outside the TAI list, it requests (1710) a TAU and updates its location. Here, if the new TAI is not the area managed by the existing MME, a new MME 1704 is allocated.

The new MME 1704 should fetch the UE context and GW connection information that the existing MME 1702 used to have, and accordingly, it sends a "Context request" message to the existing MME 1702 (through an S10 interface) (1712).

If the existing MME is using CUPS, it would have both a CP GW address and UP GW address. Specifically, it may separately have a CP S-GW and CP P-GW and a UP S-GW and UP P-GW. The new MME should receive the information from the existing MME to provide connectivity to the UE.

Thereafter, the new MME 1702 may send a "Create session request" or "Modify bearer request" to the CP GW 1706 (1714), establishing a connection between the UP GW and eNB serving the UE. As necessary, a new UP GW may be allocated, which may be determined by the CP GW.

The MMEGI may be used to be aware whether the existing MME uses the CUPS. The new MME may identify the MMEGI of the existing MME based on the GUTI (old GUTI) value received from the UE. The new MME may determine whether the existing MME is a MME using the CUPS by looking at a particular value of the MMEGI. A look up value by which the entity is an entity using the CUPS may be set up in the MMEGI value. If part of the MMEGI has the particular value, the corresponding MME may be determined to be the entity using the CUPS.

If the new MME identifies that the existing MME is an entity using the CUPS, it sends a "Context request" through the S10 interface to fetch the connection information about the GW and context for the UE. The new MME may explicitly request a CP S-GW address, CP P-GW address, UP S-GW address, and UP P-GW address through the "Context request." The GW address may receive at least one of a tunnel endpoint ID (TEID) value and IP address.

Now described are methods and apparatuses for establishing a connection for a CIoT UE to send data with reference to FIGS. 18 to 22.

The existing network equipment may be changed for CIoT. For example, there may be a CIoT-dedicated eNB or there may be an eNB obtained by adding a CIoT function to an existing eNB. According to the present disclosure, the CIoT-dedicated eNB or the eNB obtained by adding a CIoT function to an existing eNB is called a CIoT RAN for convenience. Likewise, a core network present in the cellular network may exist for CIoT purposes. According to the present disclosure, a network entity for CIoT is called a CIoT core network (CN) node, which is referred to as C-SGN by the 3GPP. CIoT CN node means an entity having the functions of a MME and S-GW in the LTE system or may be an entity further including the function of a P-GW. Accordingly, according to the present disclosure, the C-SGN may denote a MME.

The CIoT CN node may not only perform CIoT UE context management, mobility management, and signaling session management but may also transfer UE data to an application server or transfer data from the application server to the UE. That is, the CIoT CN node may provide a gateway function to the CIoT UE and may play a role as a router receiving data from the CIoT RAN and routing the data to the application server. In case the CIoT CN node further includes the function of the P-GW, the CIoT CN node may transmit user plane data directly to the application server.

The CIoT UE, by its nature, intermittently transmits/receives small data. Accordingly, without establishing a user plane connection between the CIoT UE and the CIoT CN node, it may establish a control plane connection alone and transmit user plane data through the control plane connection. This allows for omission of the operation of establishing a user plane connection, the operation of encrypting user plane, or control information signaling procedure for establishing a user plane connection, providing efficiency from a radio resource and network perspective. Such scheme is herein called a control plane (CP)-based solution for ease of description.

Meanwhile, the CIoT UE may establish a user plane connection to transmit small data. The CIoT UE establishes a radio resource control (RRC) connection with the CIoT RAN, and the CIoT RAN establishes a user plane bearer connection through signaling with the C-SGN. The CIoT UE establishes a DRB connection with the CIoT RAN, and the CIoT RAN establishes a user plane bearer connection with the C-SGN. Accordingly, data sent from the CIoT UE is transmitted through the user plane like in the existing scheme where a LTE UE sends. Such solution is herein called a user plane (UP)-based solution for ease of description.

Figure 18:
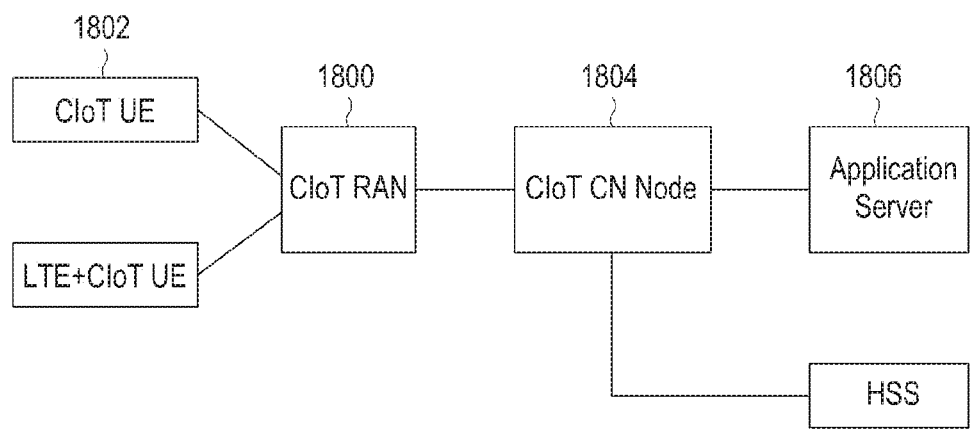
FIG. 18 is a view illustrating an example of a network architecture supporting a CIoT service.

FIG. 18 is a view illustrating an example of a network architecture supporting a CIoT service.

In order to support a CIoT service, the network may have a CIoT-dedicated eNB or an eNB obtained by adding a CIoT function to an existing eNB. In this disclosure, the CIoT-dedicated eNB and the eNB obtained by adding a CIoT function to the existing eNB is referred to as a CIoT RAN 1800. The CIoT-dedicated core network, i.e., CIoT CN node 1804, present in the cellular network supports data transmission between the UE 1802 and an application server 1806.

The CIoT UE 1802 may inform that the transmission is a small data transmission when establishing a RRC connection and may inform that it is to use the UP-based solution. The CIoT UE may add an indication therefor to a RRC message. Using the UP-based solution may be an indication meaning that the UP-based solution is to be used or infer that the UP-based solution is to be used as an indication that DRB setup is required. This is why the CP-based solution does not set up a DRB.

The CIoT RAN 1800 may provide a particular RRC function to the CIoT UE using the UP-based solution, which is RRC suspend and RRC resume. The CIoT UE and the CIoT RAN mutually communicate data through a RRC connection. If there is no data communication for a predetermined time, the RRC connection is released. In this case, all of the radio resources that the UE has used are released, and if the UE requests a RRC connection, new radio resources and a DRB are allocated, establishing a RRC connection.

Further, as necessary, it performs a command for access stratum (AS) security between the UE and the eNB, generating a security material. The RRC suspend and the RRC resume have been proposed as schemes for saving the security material generation process.

The CIoT RAN transitions into the RRC suspend state unless the CIoT UE transmits data for a predetermined time. Here, the CIoT RAN sends a "RRC Connection Suspend" message to the CIoT UE so that the UE transitions into the RRC suspend state. The CIoT RAN includes a resume ID in a "RRC Connection Suspend" message and transfers the same to the CIoT UE, and the CIoT UE uses the resume ID upon resuming the RRC connection.

The CIoT RAN having determined to transitioned into the RRC suspend state stores the radio resource-related information and AS security information that the UE has used.

The CIoT RAN informs the C-SGN (or MME) of deactivating the UE's user plane context, and the C-SGN releases the user plane bearer. At this time, the C-SGN stores the context for the UE, user plane bearer context, and security material.

The UE having transitioned into the RRC suspend state by the above procedure operates in the RRC idle state like in the existing LTE system.

In case the CIoT UE having transitioned into the RRC suspend state is required to send data again, it initiates a RRC resume procedure. The CIoT UE transfers a "RRC Connection Resume request" message to the CIoT RAN. At this time, it includes a resume ID in the message and transfers the same. The CIoT RAN reactivates the UE-related context, AS security material, and radio resource-related information that it has stored in the RRC suspend operation based on the resume ID. The CIoT RAN includes the resume ID and DRB information that the UE is to use in the "RRC Connection Resume complete" message and sends the message. From then on, the UE may send data to the CIoT RAN. The CIoT RAN requests the C-SGN to reactivate the UE context, and the C-SGN reactivates the user plane bearer-related information that the UE had used before transitioning into the suspend state. If the C-SGN informs the CIoT RAN that the activation of the user plane bearer has been complete, the CIoT RAN may transmit uplink data that has been received from the UE, if any, through the user plane bearer.

The RRC Connection Suspend" message is initiated in the CIoT RAN when there is no transmission/reception with the CIoT UE for a predetermined time. Such RRC suspend operation may be performed based on a timer. That is, if the timer expires, a predetermined time after the UE's last data transmission/reception has been performed, the CIoT RAN may suspend the RRC connection.

However, the RRC suspend method by the CIoT RAN should disadvantageously and unnecessarily maintain the RRC connection for a particular time.

The CIoT traffic has a low data rate and small volume, delay tolerant, periodic/aperiodic (per-event), and response necessary/unnecessary. This means that the CIoT UE should determine the time of transmission of next data or shout be able to determine on its own whether to wait for a response. Accordingly, the CIoT UE may determine the time of suspending its RRC connection.

Thus, proposed herein is a method for the CIoT UE to request the eNB to do RRC suspend.

Further, the CIoT RAN or C-SGN (or MME) may be changed upon the RRC resume procedure. In other words, in case the UE moves to another area or it needs to attach to another C-SGN due to a C-SGN congestion, the CIoT RAN or C-SGN having received a RRC resume request that the UE has initiated may not have a context for the resume ID that the UE has sent because it may differ from the CIoT RAN or C-SGN when the RRC is suspended. In this case, the resume procedure requested by the UE fails. Accordingly, the UE releases the RRC connection and sends a "RRC connection request" to the CIoT RAN to perform connection, and when the C-SGN is changed, it needs to perform TAU to register in the C-SGN.

Since such RRC connection request and TAU process may cause a connection delay, the present disclosure proposes an operation for addressing this issue.

According to the present disclosure, there are proposed a method for a UE to previously determine whether the C-SGN has been changed and perform TAU before a resume procedure, a method in which an eNB determines whether the C-SGN has been changed based on the location of the UE access and informs the existing C-SGN, and the existing C-SGN transfers the context for the UE's user plane resume to the new C-SGN, and (in case the CIoT RAN has changed) a method in which the new CIoT RAN sends the existing CIoT RAN a context for the UE's RRC resume and fetches the same, and the existing CIoT RAN locally releases the related context.

Figure 19:
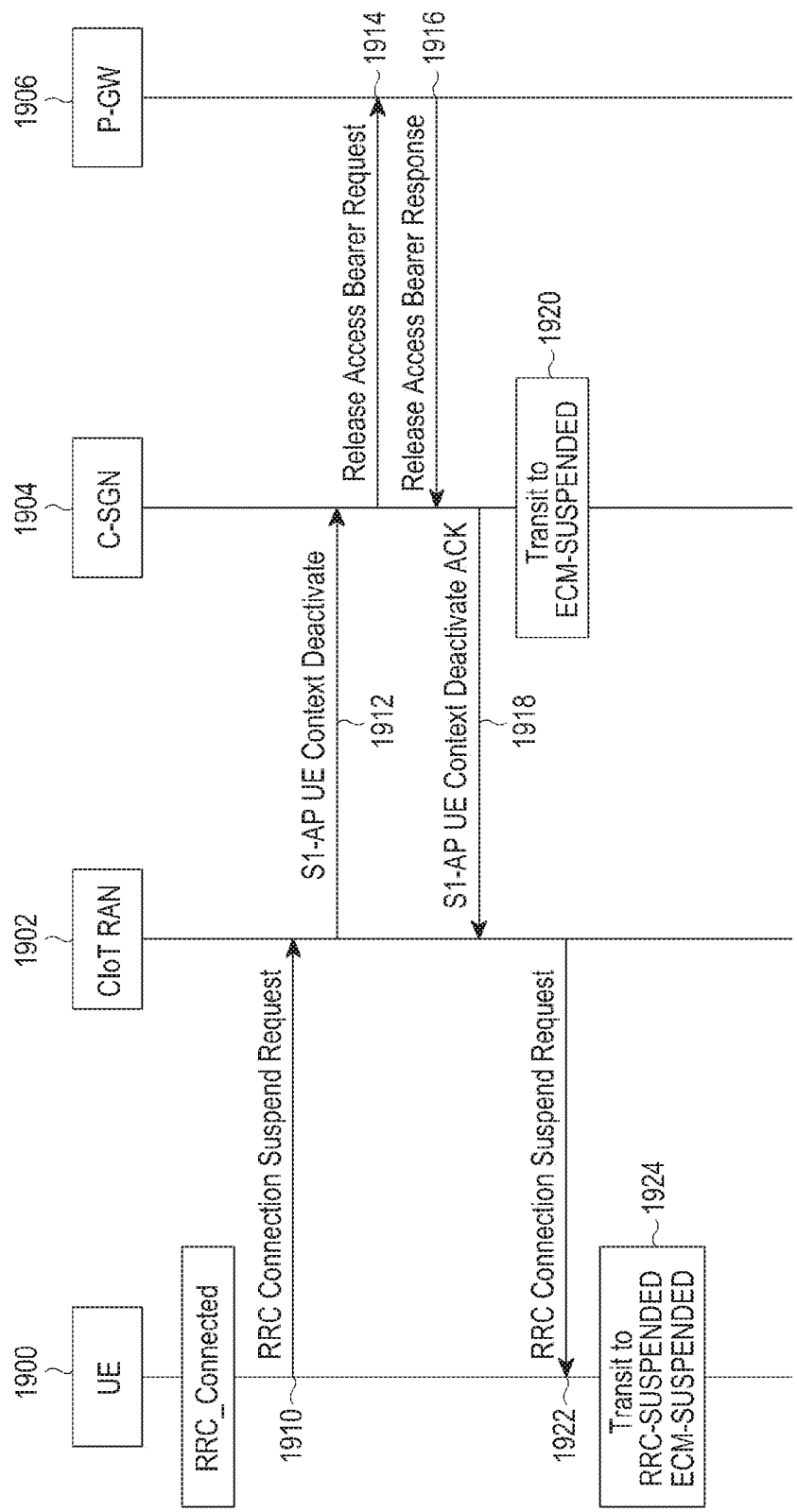
FIG. 19 is a view illustrating an example of a RRC connection suspend request method initialized by a UE.

FIG. 19 is a view illustrating an example of a RRC connection suspend request method initialized by a UE.

FIG. 19 illustrates an example in which the CIoT UE 1900 sends a "RRC Connection Suspend Request" to the CIoT RAN in order to suspend the RRC connection that the UE has used and the CIoT RAN and C-SGN perform operations accordingly, according to an embodiment of the present disclosure. In FIG. 19, the P-GW corresponds to where the C-SGN includes no P-GW. In case the C-SGN includes the P-GW, the messages shown in the figure may internally be processed.

After periodically sending data, the CIoT UE 1900 determines that there is no need for additional data transmission and may determine to transition into the RRC Suspend. Or, after data transmission and upon expecting a response thereto, the UE may determine that there is no more need for data transmission and there is no more data to receive after receiving a response, and may determine to transition into the RRC suspend. Or, as it exceeds the limit of data that may be sent from the CIoT UE and thus no more data may be sent, it may determine to transition into the RRC suspend. The reason whey RRC suspend instead of RRC release is performed is for a quicker connection to the network upon resuming transmission/reception of data.

The CIoT UE, after passing through the above determination process, sends a RRC Connection Suspend Request message to the CIoT RAN (1910). This message may include a C-RNTI. The C-RNTI is an identifier for differentiating a UE from another in the cell and is ID information about a unique UE in the eNB. Accordingly, the CIoT RAN may be aware of which UE's RRC connection should be suspended by looking at the C-RNTI. The CIoT UE may send a security context in the message. This information indicates security-related information to be used in a next RRC connection, i.e., a material for generating a security key or a security algorithm for use in a next connection in cases where the UE needs to change the security key or the security algorithm should be changed.

The CIoT RAN 1902 receiving the RRC Connection Suspend request from the CIoT UE 1900 stores RRC connection-related information. The RRC connection-related information may include an AS security material, bearer ID or DRB ID, or radio resource information used in the physical layer or MAC layer.

The CIoT RAN sends a UE context deactivate message to the C-SGN so that the C-SGN 1904 releases the user plane bearer resource for the UE (1914 and 1916).

The C-SGN 1904 maintains the user plane-related information and bearer context that the UE has used in preparation for a resume procedure. The user plane-related information and bearer context indicate the bearer ID or E-RAB ID, the S5 TEID (where the C-SGN does not include a P-GW) for connection to the P-GW, a tunneling address where there is a peer to peer tunneling up to the application server, and a security material used by the UE. Thereafter, the C-SGN releases the user plane bearer resources for the CIoT UE, informs the CIoT RAN that the UE context has been deactivated (1918), and then transitions into the ECM-SUSPENDED state (1920). In the ECM-SUSPENDED state, the C-SGN operates in the same way as if the UE is in the ECM-IDLE state.

When receiving a response indicating that the C-SGN has released the UE's user plane bearer (1918), the CIoT RAN 1902 allocates a resume ID for the UE 1900 and includes the same in a RRC connection suspend message and sends the message to the UE (1922). The resume ID is created based on the CIoT RAN's ID, and the RRC connection-related information of the particular CIoT UE described above may be indexed based on the resume ID. The CIoT RAN may include a security context in the RRC connection suspend message, where the security context indicates security information that the CIoT UE is to use to perform RRC resume. For example, a parameter necessary for key chaining or security algorithm to be used may be included.

Having received the message, the UE may store RRC connection-related information and may map the same to the received resume ID so that indexing is possible. Thereafter, it transitions into the RRC-suspended state and ECM-suspended state (1924).

Figure 20:
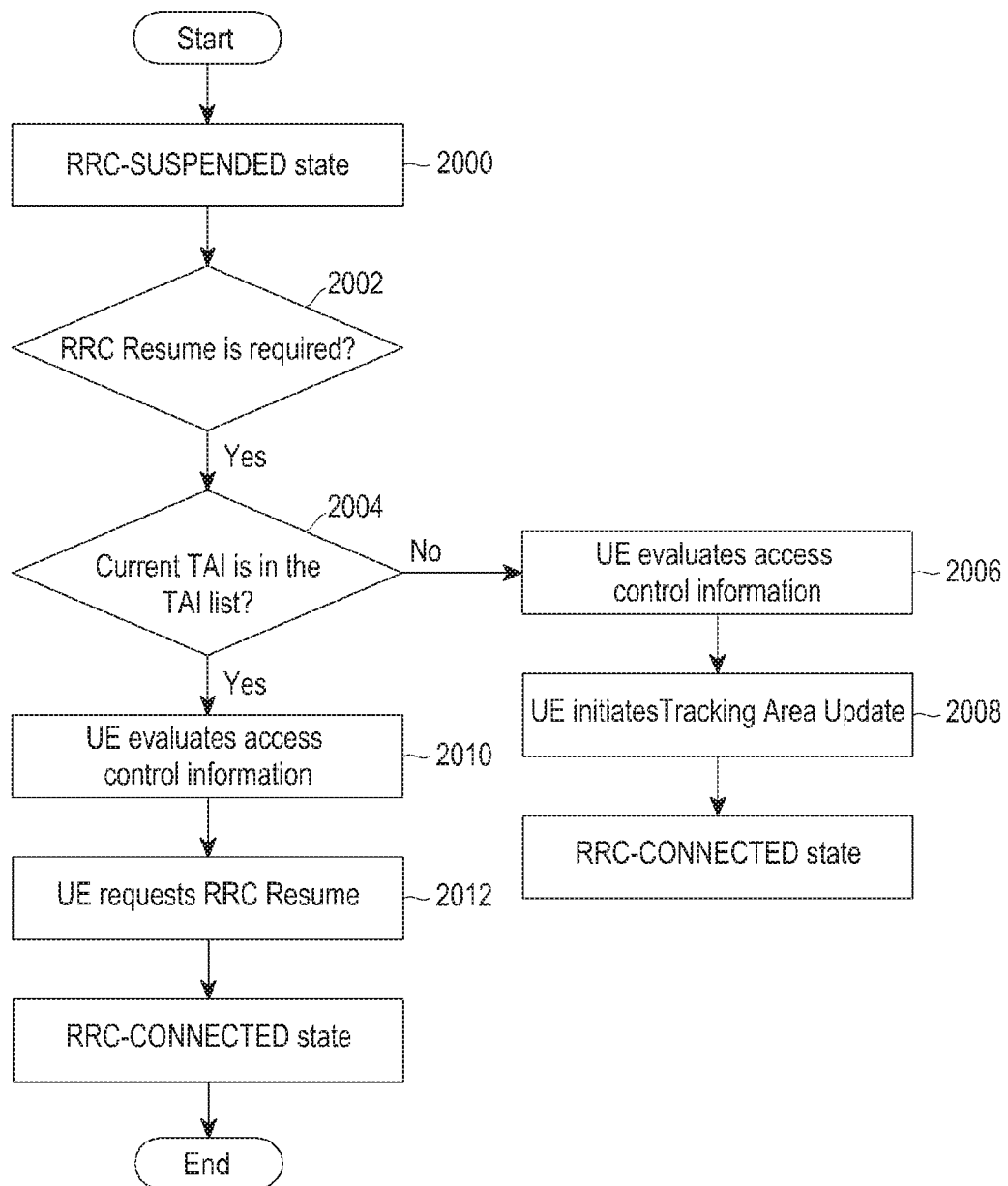
FIG. 20 is a view illustrating an example of a method for first performing a TAU by determining whether a C-SGN changes before a UE initializes to resume a RRC.

FIG. 20 is a view illustrating an example of a method for first performing a TAU by determining whether a C-SGN changes before a UE initializes to resume a RRC.

Where the C-SGN is changed when the CIoT UE performs RRC resume, it cannot activate a correct context, failing to establish a RRC connection. After sending a RRC connection request, it receives an allocation of a new C-SGN through the TAU and may then use a CIoT service. Thus, a long delay may occur until before connecting to the network.

FIG. 20 illustrates a method in which the UE previously performs tracking area update (TAU) in order to avoid such delay.

The CIoT UE is in a RRC-SUSPENDED state (2000), and when it has data to send or receive and thus receives a paging, it may determine that RRC resume is necessary (2002).

Before performing the RRC resume, the UE may identify the tracking area identity (TAI) of the area where it camps (2004), and if escaping from the TAI list received from the existing C-SGN, it may predict that the C-SGN has been changed.

Accordingly, where the current TAI is not in the TAI list, it initiates the TAU to connect to a new C-SGN (2008). Before initiating the TAU, the UE may perform access barring through information broadcast from the CIoT RAN (2006).

Where the current TAI identified by the UE is included in the TAI list, the TAU is not necessary. Thus, after applying access control information provided from the CIoT RAN (2010), if access is permitted, it sends a RRC connection resume request to the CIoT RAN (2012). The RRC connection resume request may include a resume ID, a DRB ID, and a RRC establishment cause. Having received the same, the CIoT RAN performs the remaining operations for the RRC connection resume. For example, after identifying the UE context through the received CIoT RAN, if there is a result matching, the CIoT RAN may send a RRC connection resume complete to the UE and a UE context activate message to the C-SGN, reestablishing the UE's user plane bearer.

Figure 21:
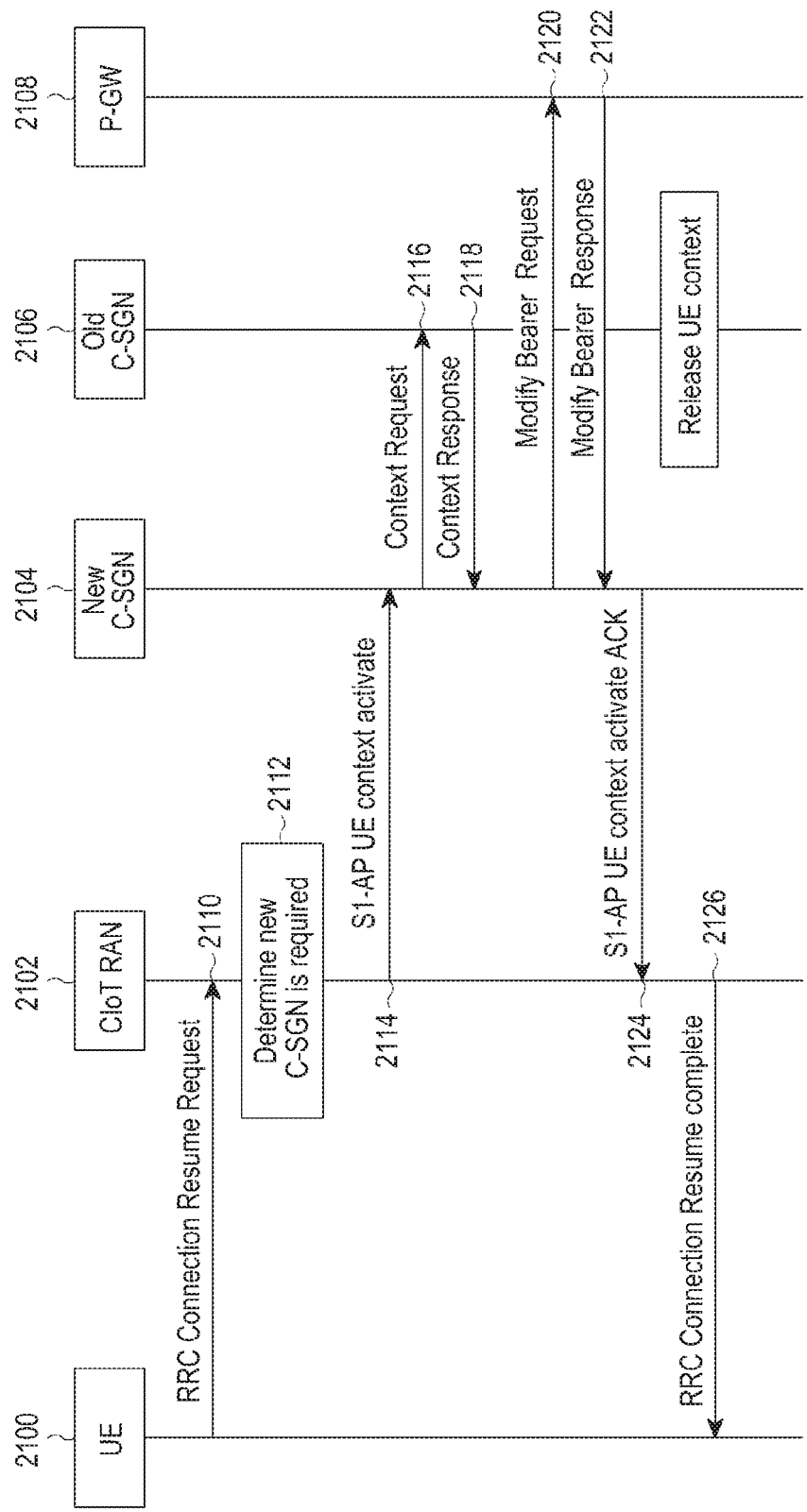
FIG. 21 is a view illustrating an example of a method for performing a RRC connection resume procedure when a CIoT RAN remains the same while only a C-SGN changes.

FIG. 21 is a view illustrating an example of a method for performing a RRC connection resume procedure when a CIoT RAN remains the same while only a C-SGN changes.

FIG. 21 illustrates a method in which, where the CIoT RAN remains the same, but the C-SGN is changed, the UE transfers the UE context that the existing C-SGN used to have to the new C-SGN when the UE performs RRC resume to establish a user plane bearer connection of the UE. Where the eNB is the same but the C-SGN is changed, in case the eNB covers a significantly large area, and it moves within the eNB but TAI changes or a connection to a particular C-SGN in a particular area is needed, or the eNB goes on an overload alarm as the C-SGN encounters a congestion, the eNB should connect to the new C-SGN and thus the C-SGN should be changed.

The CIoT RAN (eNB) 2102 receiving the RRC resume request from the UE 2100 identifies whether the new C-SGN is needed as above (2112). Where the new C-SGN 2104 is determined to be needed, it transfers the UE's ID and old C-SGN's address while transmitting a UE context activate message to the new C-SGN 2104 (2114). The ID of the UE 2100 may be a GUTI value. The GUTI may be a value allocated by the old C-SGN 2106. The new C-SGN may discover the old C-SGN by looking at the GUTI. The address of the old C-SGN may be an ID address, and this may be a C-SGN ID by which the old C-SGN may be differentiated.

The new C-SGN may discover the old C-SGN based on the information and send a message. Determining that the UE context activate message received from the CIoT RAN is not the request for the UE that the new C-SGN has been in charge of, the new C-SGN finds the old C-SGN and sends a context request to request a context for the CIoT UE (2116).

The old C-SGN transfers the context for the CIoT UE it has stored to the new C-SGN through a context response (2118). (the context for the CIoT UE is the same as the context described above in connection with the method).

Having received the context, the new C-SGN establishes a user plane bearer based on the context. Where the C-SGN does not include the P-GW 2108, it sends a modify bearer request to the P-GW to establish an S5 connection (2120 and 2122). Since the C-SGN includes an S-GW, it is obvious that a user plane bearer connection is internally established (S1-u interface connection).

The new C-SGN, after hosting to establish a user plane bearer based on the UE context, transmits a UE context activate ACK to the CIoT RAN (2124). The ACK includes a GW address for allowing the CIoT RAN to use the established user plane bearer.

Having received the ACK, the CIoT RAN, since the user plane bearer for the CIoT UE has been established, sends a RRC connection resume complete message to the UE, allowing the UE to perform transmission and reception (2126). The UE and CIoT RAN, and GWs for user plane use the user plane by utilizing the E-RAB ID, DRB ID, and security algorithm that used to be used before the UE is suspended.

Figure 22:
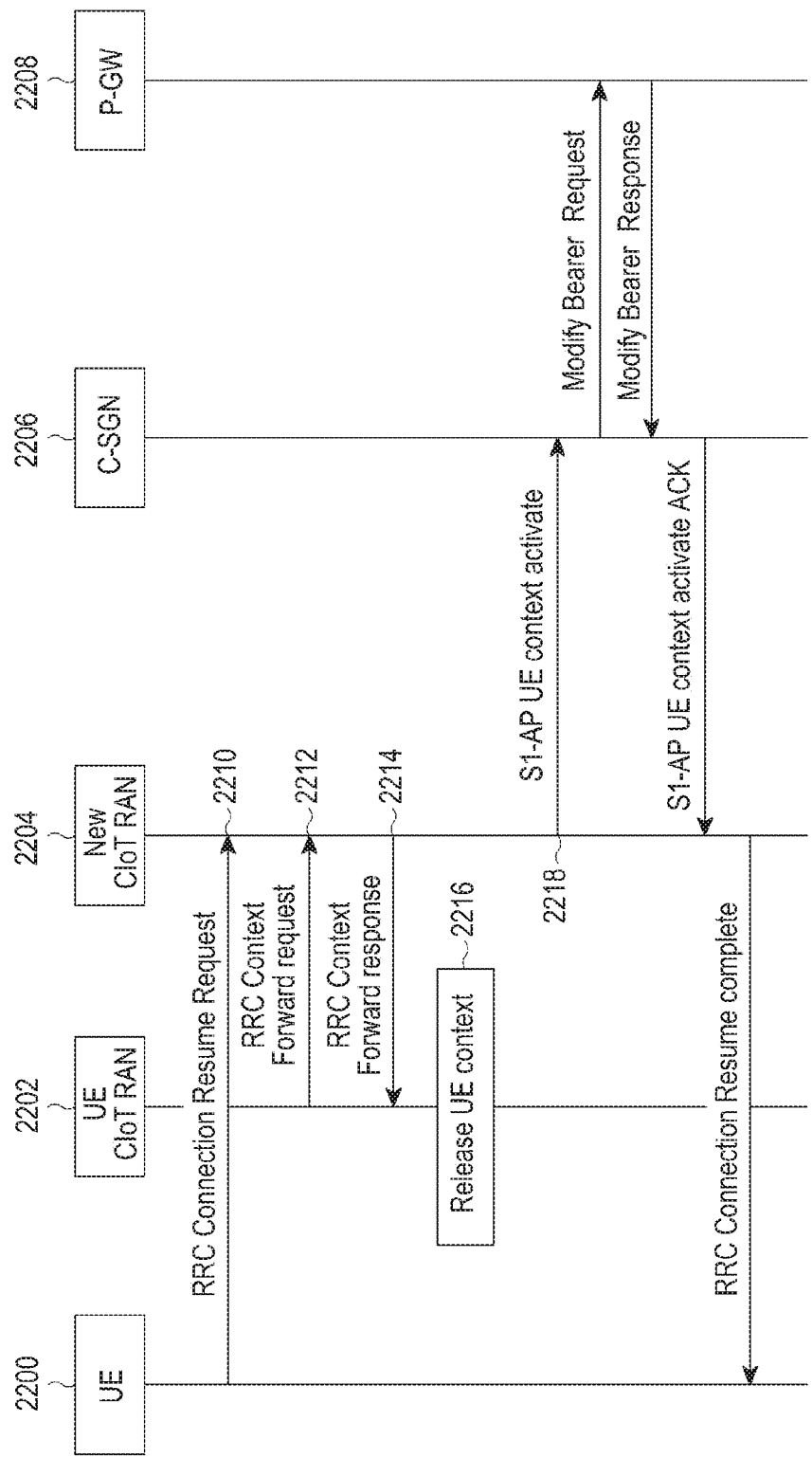
FIG. 22 is a view illustrating an example of a method for a UE to initialize to resume a RRC connection when a CIoT RAN serving the UE changes according to the present disclosure.

FIG. 22 is a view illustrating an example of a method in which, where the CIoT RAN is changed when the CIoT UE requests RRC resume, the new CIoT RAN receives a context from the existing CIoT RAN and resumes the RRC connection.

FIG. 22 is a view illustrating an example of a method for a UE to initialize to resume a RRC connection when a CIoT RAN serving the UE changes according to the present disclosure.

The UE 2200 may move in the RRC suspend state. The UE moves without involvement of the eNB like in the RRC idle state, and the eNB 2202 is unaware of the location of the UE before the UE sends a request. The UE moves to camp on the new cell. The UE which used to be in the RRC suspend state, if needing to establish a RRC connection for data transmission/reception, initiates a RRC resume procedure. Since the UE is in the area which is managed by the CIoT RAN, the UE transmits a RRC connection resume request message to the new CIoT RAN 2204.

The new CIoT RAN 2204 may identify which CIoT RAN the UE has been before by looking at the resume ID included in the RRC connection resume request sent from the UE. That is, the new CIoT RAN may figure out the old CIoT RAN by looking at the resume ID and sends a request for context for RRC resume to the old CIoT RAN (2212) (RRC context forward request). The message 2212 may include the resume ID and the DRB ID and E-RAB ID that the UE used to use.

Having received the same, the old CIoT RAN 2202 may determine which RRC context is indicated by looking at the resume ID (or additionally DRB ID or E-RAB ID) included in the message and transfers the RRC connection-related information it used to store to the new CIoT RAN 2204 (2214). (RRC context forward response message)

Thereafter, the old CIoT RAN releases the UE context after a predetermined time (2216). The reason why it is released after the predetermined time is that a request may be made again due to a resume operation failure or context loss, or the UE returns to the old CIoT RAN to perform a RRC resume.

The new CIoT RAN 2204 receiving the RRC context from the old CIoT RAN informs the C-SGN 2206 of the resuming of the suspended UE based on the information (Activate) (2218), and the C-SGN completes the resume procedure according to the above-described procedure.

Figure 23:
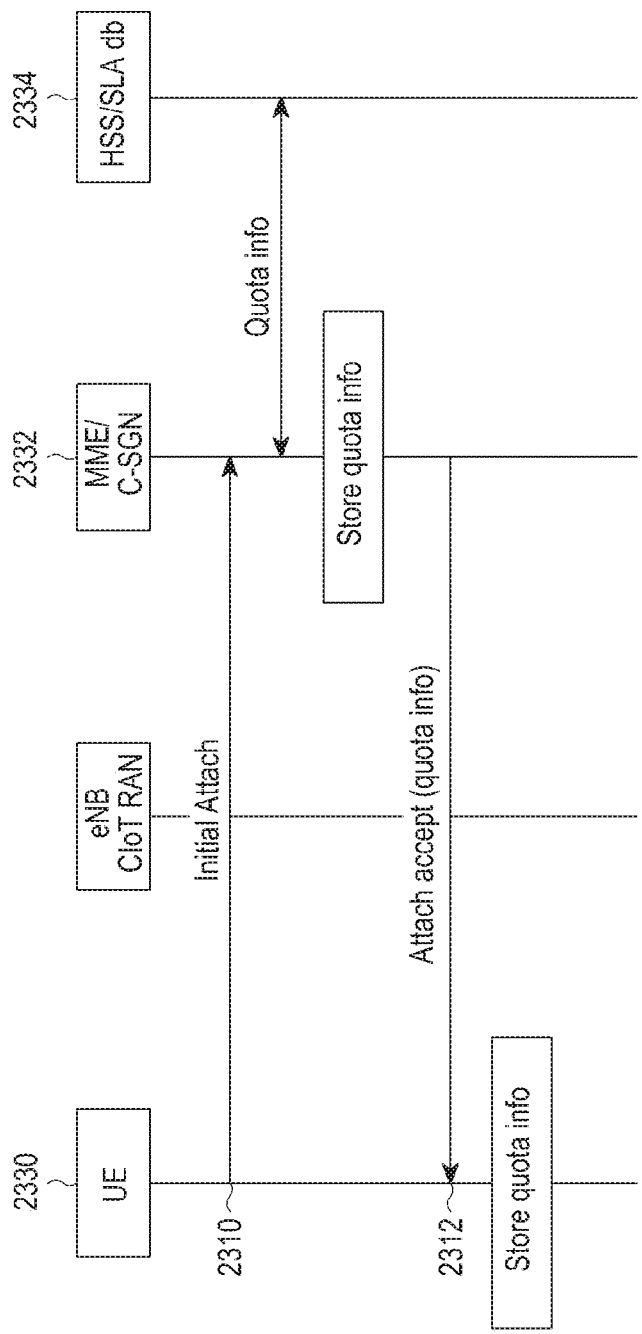
FIG. 23 is a view illustrating an example of a method for a C-SGN to transferring an allowed allocation to a UE when the UE connects to a network providing a CIoT service.
Figure 24:
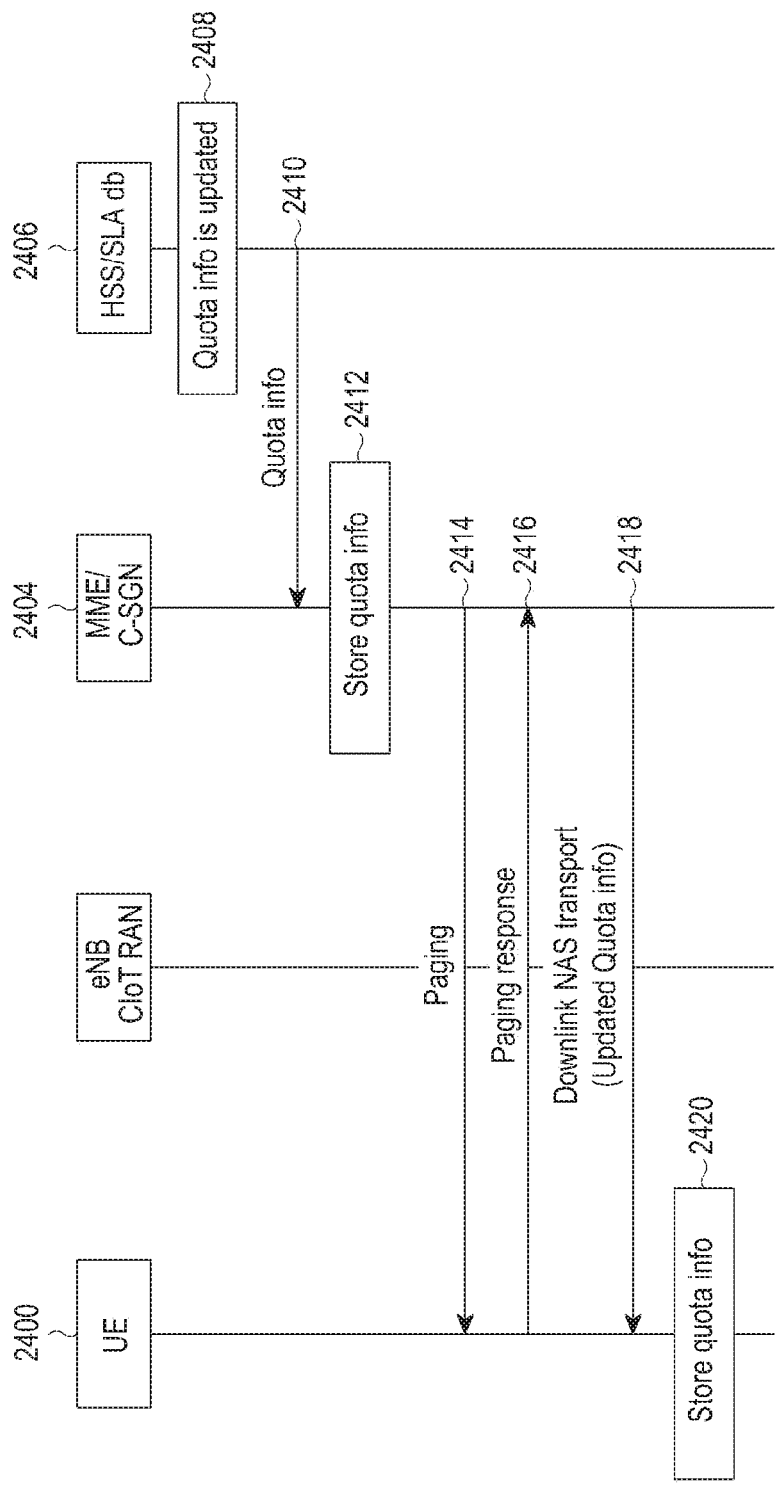
FIG. 24 is a view illustrating an example of a method for transferring updated allocation information to a UE after the UE connects with a network.
Figure 25:
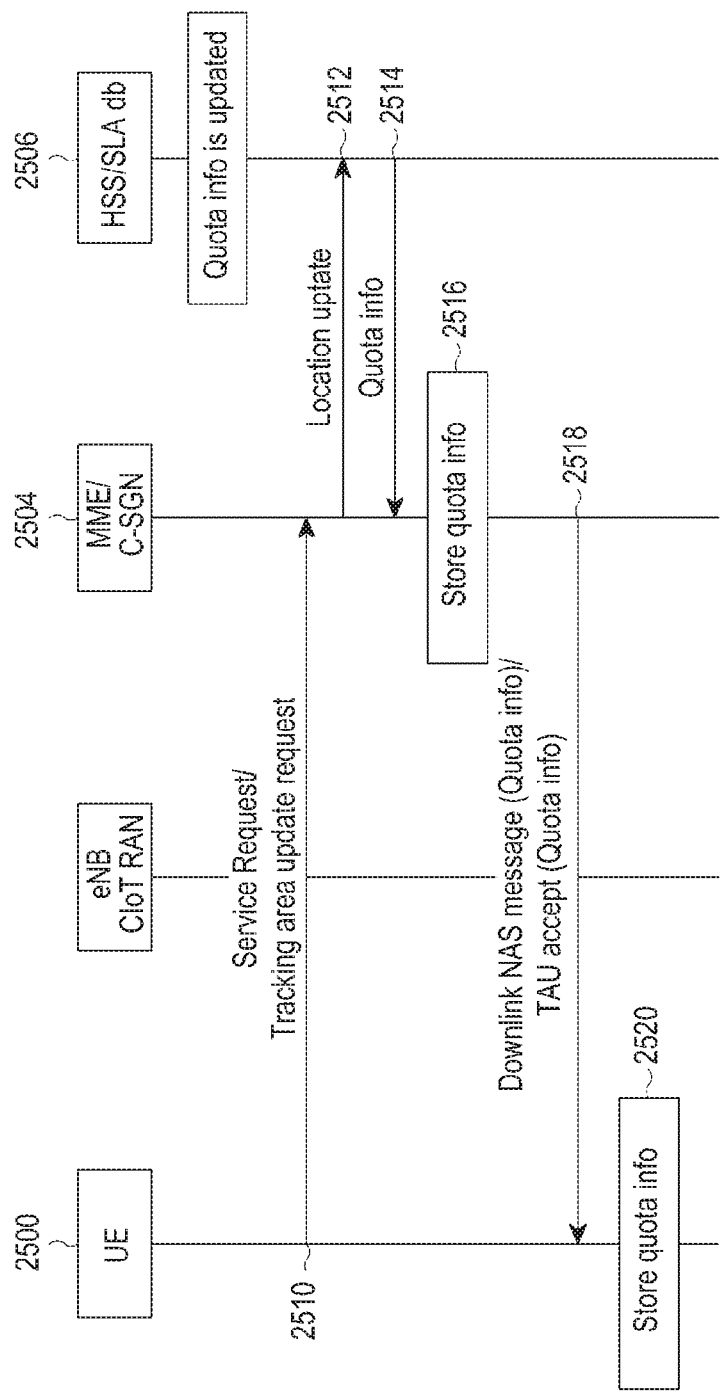
FIG. 25 is a view illustrating an example of a method for a UE to receive updated allocation information in a NAS procedure without paging.

Now described herein are methods and apparatuses for updating a data allocation sent from a CIoT UE referring to FIGS. 23 to 25.

The CIoT UE and the CIoT RAN mutually communicate data through a RRC connection. If there is no data communication for a predetermined time, the RRC connection is released. In this case, all of the radio resources that the UE has used are released, and if the UE requests a RRC connection, new radio resources and a DRB are allocated, establishing a RRC connection. Further, as necessary, it performs a command for access stratum (AS) security between the UE and the eNB, generating a security material. The RRC suspend and the RRC resume have been proposed to save this process.

FIG. 23 is a view illustrating an example of a method for a C-SGN to transferring an allowed allocation to a UE when the UE attaches to a network providing a CIoT service.

Since the CIoT UE 2300 intermittently sends small size data, the network may impose a predetermined limit beyond which data cannot be sent. The limit of the data that the CIoT UE can send may be determined between the subscriber and the mobile communication service provider by subscription information or service level agreement (SLA). For example, the transmission data limit of the CIoT terminal can be determined by various methods such as transmission once a day, transmission of 1000 Kbytes a day, transmission of 1 Mbyte a week, and transmission of 100 times a month. This follows the data plan or SLA provided to the subscriber.

The limit or quota of data that the UE 2300 can send through a CIoT service is provided through an attach accept message 2312 from the C-SGN when the UE initially attaches to the C-SGN (2310).

However, where the data limit or quota increases, the user cannot receive a quota update by manipulating all CIoT equipment and thus needs a method for updating online in the network. The user, when the CIoT device he uses approaches a capacity limit, may increase the capacity limit by paying more for a better service. Or, an additional quota may be provided as the service agreement is varied or extended or the quota may be temporarily permitted to be increased. However, as per the current technology, the UE may only receive quota information based on the subscription information upon attaching.

Thus, according to the present disclosure, there is provided a method for providing the updated CIoT data quota information to the UE.

FIG. 24 is a view illustrating an example of a method for transferring updated allocation information to a UE after the UE connects with a network.

Referring to FIG. 24, the user may upgrade or downgrade quota info for the CIoT UE that he is using through the Internet or phone. This may be reflected onto the subscription information or a sort of database based on the SLA.

The HSS 2406 or database reflecting the updated quota information 2408 transfers the quota information updated for the UE 2400 to the C-SGN 2404 managing the UE context (2410). Since the C-SGN 2404 reports whether the UE is alive to the HSS, the HSS can be aware which C-SGN manages which UE. Or, since a connection is established between the C-SGN and the database, the C-SGN for the UE may continue to be checked and identified by the database.

Having received the updated quota information, the C-SGN stores the information (2412).

It then pages to transfer the updated quota information to the UE, waking up the UE (2414).

If the awaken UE sends a response, the C-SGN includes the updated quota info in a NAS message called a downlink NAS transport, and sends the same to the UE (2416).

Having received the same, the UE updates the quota info and performs small data transmission fitting its quota as per the updated quota info (2418).

FIG. 25 is a view illustrating an example of a method for a UE to receive updated allocation information in a NAS procedure without paging.

Described with reference to FIG. 25 is a method in which when the UE 2500 connects to the C-SGN through a service request or NAS procedure such as TAU (2510), the C-SGN provides updated quota information from the SLA database or HSS without paging.

The UE, when the TAI where the UE is located is varied or the periodic TAU timer expires, sends a tracking area update request to the C-SGN 2502 (2510). The periodic TAU timer is a timer used to identify the reachability of the UE.

Having received the same, the C-SGN may send a location update to the HSS, informing that the UE is located in its area (2512).

Having received the location update, the HSS may provide the updated quota info to a response to the location update (2514).

Having received this, the C-SGN stores the quota info (2516) and contains the quota information in a TAU accept that is a response to the TAU request and sends the same (2518).

Alternatively, where the UE sends a service request to the C-SGN, the C-SGN may send a location update to the HSS or notify the database of the UE's reachability. Having received this, the HSS or database may transfer the updated quota info to the C-SGN. The C-SGN may store the quota info (2520) and transfer the updated quota information through the downlink NAS message to the UE.

Having received this, the UE may apply the updated quota info and perform small data transmission fitting its allocation.

Now described are methods and apparatuses for managing the connectivity of a CIoT UE with reference to FIGS. 26 to 29.

As described above, the CIoT UE may use two small data transmission modes, i.e., a CP-based solution and a UP-based solution, in order to use CIoT services.

The CP-based solution is advantageous in transmitting one packet. The UP-based solution is advantageous in transmission/reception of a relatively high capacity of data, such as updating the UE's software. The UP-based solution may be more advantageous in sending several small data items to several target application servers.

The operation of the UE, CIoT RAN, or C-SGN is varied depending on the CP-based solution and the UP-based solution. The UE would select a solution depending on a solution that the CIoT RAN and the C-SGN support. However, in case the CIoT RAN and the C-SGN support both the solutions, the UE may determine whether to use the CP-based solution or the UP-based solution.

Accordingly, the UE needs to inform the CIoT RAN or the C-SGN whether it is to use the CP-based solution or UP-based solution.

According to the present disclosure, there is proposed a method in which UE informs the CIoT RAN or the C-SGN whether it is to use the CP-based solution or UP-based solution.

Further, the CIoT RAN and the C-SGN may inform of the capability about the solution that it supports upon setting up an S1 connection, i.e., whether to support of the CP-based solution or the CP-based solution+UP-based solution, and establish an S1 connection accordingly. For example, if the CIoT RAN supports the CP-based solution+UP-based solution, it may establish an S1 connection with a C-SGN supporting the CP-based solution+UP-based solution, rather than a C-SGN supporting only the CP-based solution. Of course, unless there is a C-SGN, the CIoT RAN may establish an S1 connection with the C-SGN supporting only the CP-based solution and may support the CP-based solution alone. Since, for the C-SGN, the CP-based solution is mandatory and the UP-based solution is optional, there are only two categories (i.e., CP and CP+UP) for the capability of negotiation between the CIoT RAN and the C-SGN.

Further, the UE using the UP-based solution may experience rejection of a connection request or access barring due to a DRB congestion (i.e., user plane bearer congestion). In this case, the UE having been using the UP-based solution may switch into the CP-based solution, attempting small data transmission. This is why the user plane is congested but the control plane is not. Thus, according to the present disclosure, described is a method in which a UE having been using the UP-based solution switches into the CP-based solution, attempting data transmission.

Figure 26:
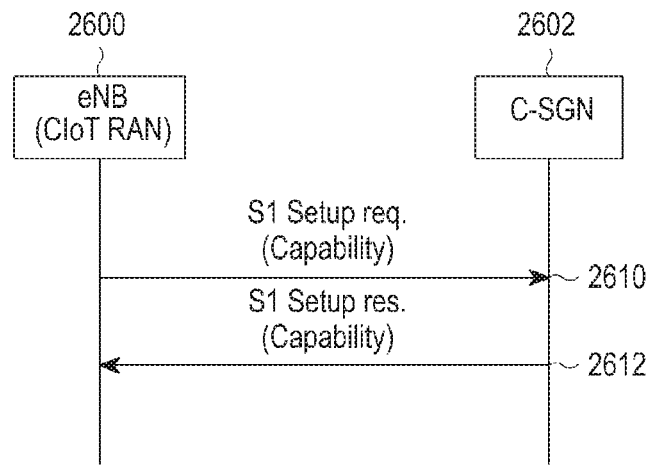
FIG. 26 is a view illustrating a method for negotiating the capability of a CP-based solution and UP-based solution when a CIoT RAN and a C-SGN set up an S1 connection.

FIG. 26 is a view illustrating a method for negotiating the capability of a CP-based solution and UP-based solution when a CIoT RAN and a C-SGN set up an S1 connection.

The CIoT RAN 2600 needs an S1 connection with the C-SGN 2602, and to support this, transfers an S1 setup request message to the C-SGN (2610). A method for the CIoT RAN to select the C-SGN follows the mobile communication service provider's policy or settings. The CIoT RAN shows the capability of a solution that it supports for a CIoT service in the S1 setup request message. A new parameter indicating the CIoT capability may be used in the S1 setup request message. The CIoT capability is a value indicating the support of the CP-based solution or the support of CP-based solution+UP-based solution. As another method, the CIoT RAN may indicate its CIoT capability using the eNB name, i.e., the CIoT RAN name, contained in the S1 setup request message. In this case, a particular value may be set up in configuring the eNB name value so that the mobile communication service provider may distinguish the capability of the CP-based solution/CP-based solution+UP-based solution with the name of the eNB. The particular value may be deemed a sort of look-up value. For example, if CP is included in the name, it may recognize that the CP-based solution is supported, or if a particular code value (e.g., FFFF) is included in the name, it may recognize that the CP-based solution+UP-based solution are supported. The C-SGN figures out whether the CIoT RAN is one supporting the CP-based solution or one supporting the CP-based solution+UP-based solution by looking at the received eNB name value.

Having known the CIoT capability of the CIoT RAN, the C-SGN sends an S1 setup response to the CIoT RAN (2612), completing the S1 connection setup. The C-SGN may include information about a solution that it supports in the S1 setup response. As described above, a new parameter indicating the CIoT capability of the C-SGN may be used, or upon setting up the MME name, i.e., the C-SGN name, it may be included in such a manner that if a particular value is set, the CIoT capability may be known. Or, the CIoT capability may be indicated using the GUMMEI, part of the MME ID. In case a particular portion of the GUMMEI is filled with a particular value, it may be determined as supporting the CP-based solution or CP-based solution+UP-based solution. If the CIoT RAN, although supporting both the CP-based solution and the UP-based solution, happens to know in the S1 setup response that the C-SGN supports only the CP-based solution, it supports only the CP-based solution while in the S1 connection with the C-SGN. This is true for other possibilities. The CIoT RAN sets up the CIoT solution that it may provide to the UE depending on the CIoT capability transferred from the C-SGN. The CIoT RAN, after setting up the CIoT solution that it may support, indicates the same in a system information block and broadcasts the same. The UE may be aware whether the CIoT RAN supports the CP-based solution or the CP-based solution+UP-based solution by looking at the system information block broadcast from the CIoT RAN. If the CIoT RAN supports only the CP-based solution, the UE may use the CP-based solution alone, and if the CIoT RAN supports the CP-based solution+UP-based solution, it may select and use one of the two.

Figure 27:
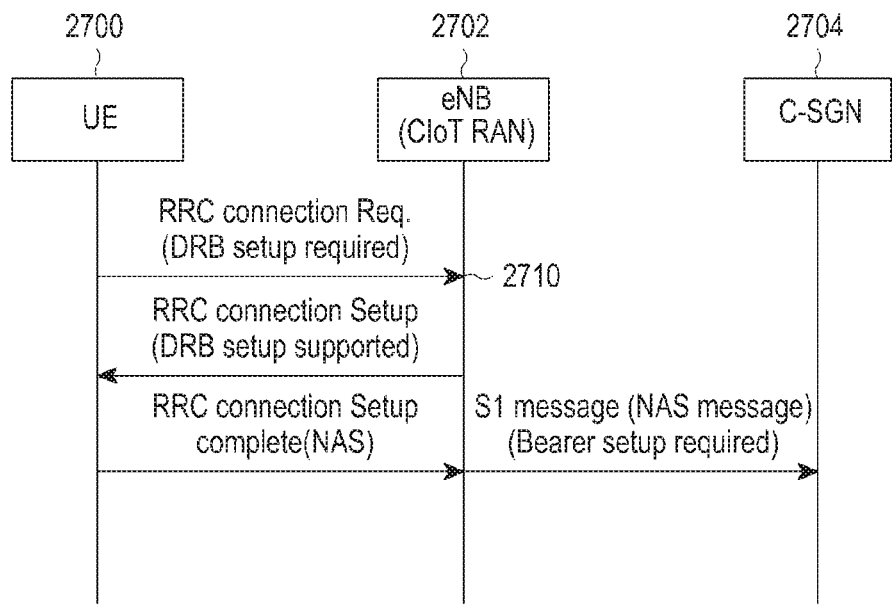
FIG. 27 is a view illustrating a method for indicating whether a UE uses a CP-based solution or an UP-based solution when requesting a CIoT RAN to establish a RRC connection.

FIG. 27 is a view illustrating a method for indicating whether a UE uses a CP-based solution or an UP-based solution when requesting a CIoT RAN to establish a RRC connection.

FIG. 27 illustrates a method for indicating whether a UE uses a CP-based solution or an UP-based solution when establishing a connection to the C-SGN. Further, described with reference to FIG. 27 is a method for indicating whether the CP-based solution or the UP-based solution is used in an S1 message sent to the C-SGN from the CIoT RAN informed of whether to use the CP-based solution or UP-based solution from the UE.

1) Method for UE 2700 to Indicate the CIoT Solution that it is to Use when Requesting a RRC Connection The UE 2700 sends a RRC connection request to the CIoT RAN 2702, requesting a RRC connection. At this time, the UE may indicate whether it is to use the CP-based solution or the UP-based solution.

As a first method, it may include an indication as to whether to use the CP-based solution or the UP-based solution in a RRC connection request message 2710 and transmit the same. This is an indication that is not included in the RRC connection request message using the legacy LTE system. Further, the indication may be an indication requiring a DRB setup and may imply that the UP-based solution is to be used. Unless there is the indication that a DRB setup is necessary, this may imply that the CP-based solution is to be used.

As a second method, whether to use the CP-based solution or UP-based solution may be indicated in the RRC establishment cause of the RRC connection request message. The cause for the RRC connection being the small data transmission and signaling being used may be indicated in the RRC establishment cause in such a way as MO small data transmission on signaling, allowing it to be known that the CP-based solution is to be used. Or, if MO-data is indicated in the RRC establishment cause, the UE determines to use the user plane to send data, allowing it to be known that the UP-based solution is to be used.

2) Method for UE 2700 to Indicate the CIoT Solution that it Sends a NAS Message to the C-SGN 2704

The UE may indicate the CIoT solution that it is to use when sending an attach or TAU or service request to the C-SGN. The above messages all are NAS messages. The UE may indicate that it is not to set up a user plane bearer by filling the ESM container of the attach message with an empty value or excluding the ESM container value. Accordingly, the C-SGN may determine that the UE is to use the CP-based solution. (ESM container is a container for containing a message necessary for bearer setup.) Or, a parameter capable of indicating the CIoT solution may be added to the attach message and may be transmitted to the C-SGN. The UE may indicate that it is to use the user plane bearer by setting the active flag of the TAU message as true, and in this case, the C-SGN may determine that the UE is to use the UP solution. Further, the UE may add a parameter indicating whether it is the CP-based solution or UP-based solution when sending the service request message and transmit the same to the C-SGN. In case the UE uses the CP-based solution, the C-SGN does not set up the user plane bearer and does not send a session management message for session setup and management, saving signaling. In case the UE uses the UP-based solution, the C-SGN performs an operation for user plane bearer setup and performs a session management procedure for session setup and management, establishing a user plane bearer.

3) Method for Indicating Whether the CP-Based Solution or the UP-Based Solution is Used in an S1 Message Sent to the C-SGN from the CIoT RAN Informed of Whether to Use the CP-Based Solution or UP-Based Solution from the UE.

The CIoT RAN uses the S message, called an initial context setup, in order to transfer the NAS message received from the UE. Since the CIoT RAN has determined whether the UE is to use the CP-based solution or UP-based solution by method 1 above, the CIoT RAN may indicate the type of solution that the UE is to use in the initial UE message. Where the RRC establishment cause has been used as a method for distinguishing a solution in method 1 above, the same value is inputted to the RRC establishment cause of the initial UE message, allowing the C-SGN to be aware whether the UE uses the CP-based solution or UP-based solution. Or, it may set up a parameter indicating the type of solution that the UE uses, include the parameter in the initial UE message, and transfer the same to the C-SGN. The parameter may be an indication that a bearer setup is necessary or not, and no bearer setup being needed may be determined as the CP-based solution while a bearer setup being needed may be determined as the UP-based solution.

As another example, where the NAS PDU of the initial UE message does not contain an EPS session management (ESM) message sent from the UE, the C-SGN may determine that no bearer setup is needed, abstaining from providing the UP-based solution, and continue to use the CP-based solution. Where the UE intends to use the UP-based solution, the UE may send an ESM message to the C-SGN, and the C-SGN may recognize that the UP-based solution is needed, starting a bearer setup.

Figure 28:
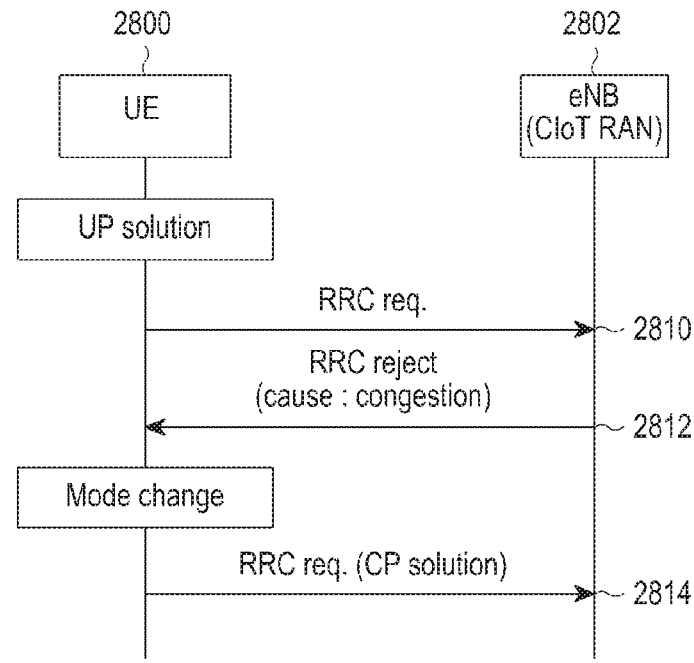
FIG. 28 is a view illustrating a method for changing a solution when a UE using a UP-based solution sends a connection request to use a UP-based solution in an idle state but the request is rejected.

FIG. 28 is a view illustrating a method for changing a solution when a UE using a UP-based solution sends a connection request to use a UP-based solution in an idle state but the request is rejected.

FIG. 28 illustrates a method in which when a UE which has used the UP-based solution turns into an idle state, and then, sends a RRC connection request to reuse the UP-based solution but the request is rejected, the UE switches into the CP-based solution and requests a RRC connection again.

The UE which has used the UP-based solution may enter into the idle state and may then send a RRC connection request to reuse the UP-based solution.

Where, although the UE 2800 sends a RRC connection request (2810), the CIoT RAN 2802 cannot establish a RRC connection due to congestion control, it transfers a RRC connection reject message (2812). Information indicating that the UE uses the UP-based solution is included in the RRC connection request message by the above-described method. At this time, the CIoT RAN may include an extended wait timer in the RRC connection reject message to prevent the UE from sending a RRC connection request during the back-off timer. Or, the CIoT RAN may include a user plane congestion indication in the RRC connection reject message and transfer the same to the UE. The eNB may reject according to the RRC establishment cause of the RRC connection request sent from the UE. Thus, if the UE attempting to use the UP-based solution is rejected for the RRC connection request, it may be determined that there is congestion in the user plane.

The UE rejected for the RRC connection request changes from the UP-based solution to the CP-based solution, sending a RRC connection request (2814). The RRC connection request message includes an indication that the UE is to use the CP-based solution as per the method proposed above.

Figure 29:
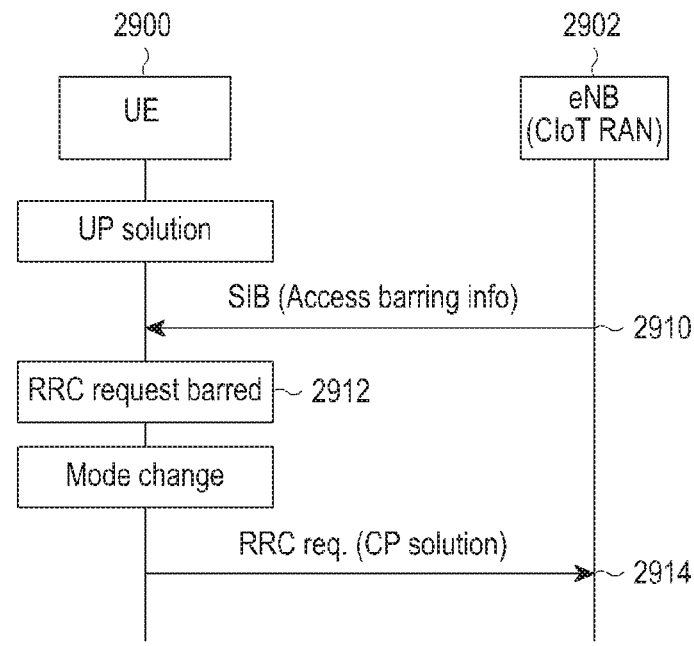
FIG. 29 is a view illustrating an example of a method for a UE to request to connect when a CIoT RAN broadcasts ban access information to an SIB.

FIG. 29 is a view illustrating an example of a method for a UE to request to connect when a CIoT RAN broadcasts ban access information to an SIB.

FIG. 29 illustrates a method in which the CIoT RAN broadcasts access barring info in system information blocks, and where the RRC connection request attempt is barred, the CIoT UE having barred access changes into the CP-based solution, resending a RRC connection request.

The UE 2900 which has used the UP-based solution may enter into the idle state and may then send a RRC connection request to reuse the UP-based solution. The CIoT RAN 2902 broadcasts access barring being applied through the system information block (2910), and having heard the same, the UE 2900 may process whether to bar access to the CIoT RAN according to the access barring info before requesting a RRC connection (2912). An access barring factor for MO-data was present in the system information block, and the UE applied the type for the MO data to the access barring process to perform a RRC connection using the UP-based solution but the access may be barred. The MO-data is a value indicating the RRC connection for mobile originated data using the UP solution.

Accordingly, if the UE attempting to use the UP-based solution fails to send a RRC connection request and is barred from access due to the access barring info for the type using the UP-based solution or MO data, it may be determined that there is congestion in the user plane.

The UE rejected for the RRC connection request changes from the UP-based solution to the CP-based solution, sending a RRC connection request (2914). The RRC connection request message includes an indication that the UE is to use the CP-based solution as per the method proposed above.

The device configurations of various network nodes according to the present disclosure are described below with reference to FIGS. 30 to 34.

Figure 30:
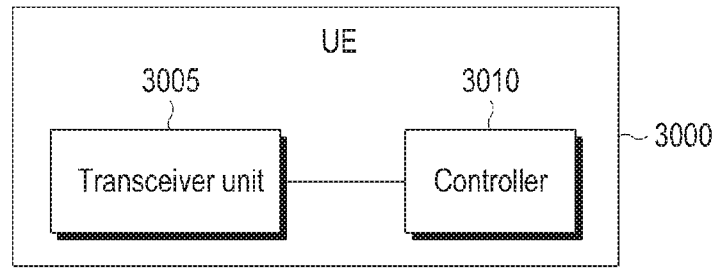
FIG. 30 is a view schematically illustrating a configuration of a UE device according to an embodiment of the present disclosure.

FIG. 30 is a view schematically illustrating a configuration of a UE device according to an embodiment of the present disclosure.

The UE 3000 may include a transceiver unit 3005 communicating signals with other communication device or an entity in a network and a controller 3010 controlling all of the operations performed by the UE 3000. It may be appreciated that all of the operations of the UE or CIoT UE described above in connection with various methods of the present disclosure are performed under the control of the controller 3010. However, the controller 3010 and the transceiver unit 3005 are not necessarily implemented as separate devices, respectively, but may be implemented in a single configuration unit in the form of, e.g., a single chip.

Figure 31:
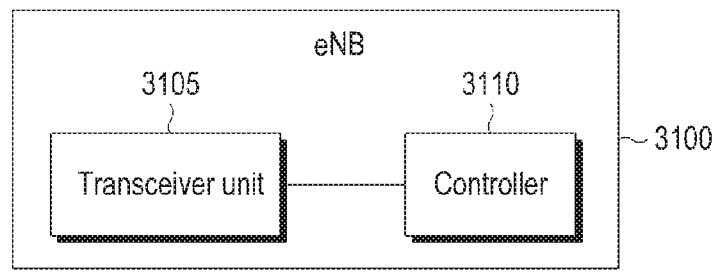
FIG. 31 is a view schematically illustrating a configuration of an eNB device according to an embodiment of the present disclosure.

FIG. 31 is a view schematically illustrating a configuration of an eNB device according to an embodiment of the present disclosure.

The eNB 3100 may include a transceiver unit 3105 communicating signals with other communication device or an entity in a network and a controller 3110 controlling all of the operations performed by the eNB 3100. It may be appreciated that all of the operations of the eNB or CIoT RAN described above in connection with various methods of the present disclosure are performed under the control of the controller 3110. However, the controller 3110 and the transceiver unit 3105 are not necessarily implemented as separate devices, respectively, but may be implemented in a single configuration unit in the form of, e.g., a single chip.

Figure 32:
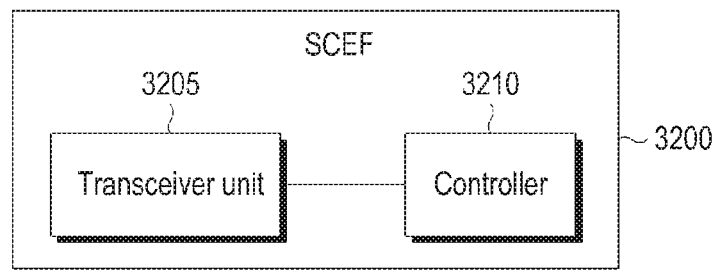
FIG. 32 is a view schematically illustrating a configuration of an SCEF device according to an embodiment of the present disclosure.

FIG. 32 is a view schematically illustrating a configuration of an SCEF device according to an embodiment of the present disclosure.

The SCEF 3200 may include a transceiver unit 3205 communicating signals with other communication device or an entity in a network and a controller 3210 controlling all of the operations performed by the SCEF 3200. It may be appreciated that all of the operations of the SCEF or MTC-IWF described above in connection with various methods of the present disclosure are performed under the control of the controller 3210. However, the controller 3210 and the transceiver unit 3205 are not necessarily implemented as separate devices, respectively, but may be implemented in a single configuration unit in the form of, e.g., a single chip.

Figure 33:
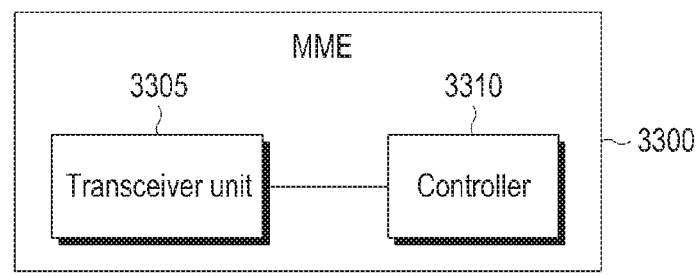
FIG. 33 is a view schematically illustrating a configuration of a MME device according to an embodiment of the present disclosure.

FIG. 33 is a view schematically illustrating a configuration of a MME device according to an embodiment of the present disclosure.

The MME 3300 may include a transceiver unit 3305 communicating signals with other communication device or an entity in a network and a controller 3310 controlling all of the operations performed by the MME 3300. It may be appreciated that all of the operations of the MME, SGSN, or C-SGN described above in connection with various methods of the present disclosure are performed under the control of the controller 3310. However, the controller 3310 and the transceiver unit 3305 are not necessarily implemented as separate devices, respectively, but may be implemented in a single configuration unit in the form of, e.g., a single chip.

Figure 34:
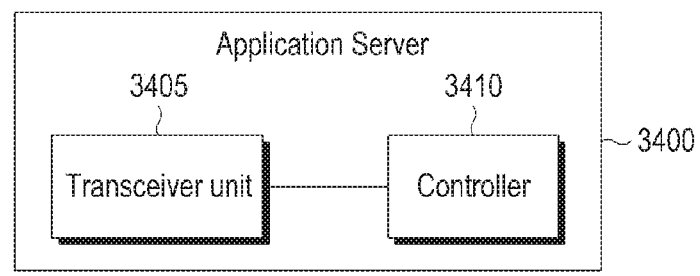
FIG. 34 is a view schematically illustrating a configuration of an application server (AS) device according to an embodiment of the present disclosure.

FIG. 34 is a view schematically illustrating a configuration of an application server (AS) device according to an embodiment of the present disclosure.

The AS 3400 may include a transceiver unit 3405 communicating signals with other communication device or an entity in a network and a controller 3410 controlling all of the operations performed by the AS 3300. It may be appreciated that all of the operations of the MME, SGSN, or C-SGN described above in connection with various methods of the present disclosure are performed under the control of the controller 3410. However, the controller 3410 and the transceiver unit 3405 are not necessarily implemented as separate devices, respectively, but may be implemented in a single configuration unit in the form of, e.g., a single chip.

It should be noted that signal flows, system configurations, and examples of control methods as shown in FIGS. 1 to 34 are not intended as limiting the scope of the present disclosure. In other words, all the components or operational steps illustrated in FIGS. 1 to 34 should not be construed as essential components to practice the present disclosure, and the present disclosure may be rather implemented with only some of the components without departing from the gist of the present disclosure.

The above-described operations may be realized by equipping a memory device retaining their corresponding codes in an entity, function, base station, or any component of a terminal in a communication system. That is, the controller in the entity, the function, the base station, or the terminal may execute the above-described operations by reading and executing the program codes stored in the memory device by a processor or central processing unit (CPU).

As described herein, various components or modules in the entity, function, eNB, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for operating a service capability exposure function (SCEF) in a cellular communication system, the method comprising:
receiving a first request message for non-internet protocol (IP) data delivery (NIDD) from a services capability server/application Server (SCS/AS), the first request message comprising non-IP data and at least one of an external identifier or a mobile station international subscriber directory number (MSISDN);
identifying the external identifier or the MSISDN corresponding to a user equipment (UE) to which the non-IP data is to be delivered;

determining whether the SC S/AS is authorized to send the first request message; and transmitting a second request message to a mobility management entity (MME) if the SCS/AS is authorized to send the first request message, the second request message comprising an international mobile subscriber identity (IMSI) and the non-IP data.

2. The method of claim 1, further comprising:
receiving a first response message from the MME; and
transmitting a second response message to the SCS/AS.

3. The method of claim 2, further comprising:
receiving the non-IP data from a MME; and
transmitting the non-IP data to the SCS/AS.

4. The method of claim 3, wherein
if the UE is roaming, the non-IP data is transmitted through an interworking SCEF (IWK-SCEF).

5. The method of claim 2, further comprising:
receiving the non-IP data from the SCS/AS;
determining whether the SCS/AS is authorized to send the non-IP data, and that the SCS/AS exceeds a rate of data allowed for the SCS/AS; and
transmitting the non-IP data to the UE if the SCS/AS is authorized and does not exceed the rate of data.

6. A service capability exposure function (SCEF) in a cellular communication system, comprising:
a transceiver; and
a controller configured to
receive, through the transceiver, a first request message for non-internet protocol (IP) data delivery from a services capability server/application server (SCS/AS), the first request message comprising non-IP data and at least one of an external identifier or a mobile station international subscriber directory number (MSISDN);
identify the external identifier or the MSISDN corresponding to a user equipment (UE) to which the non-IP data is to be delivered,
determine whether the SCS/AS is authorized to send the first request message, and
transmit a second request message to a mobility management entity (MME) if the SCS/AS is authorized to send the first request message, the second request message comprising an international mobile subscriber identity (IMSI) and the non-IP data.

7. The SCEF of claim 6, wherein the controller is further configured to:
receive a first response message from the MME; and
transmit a second response message to the SCS/AS.

8. The SCEF of claim 7, wherein the controller is further configured to:
receive the non-IP data from a user equipment (UE); and
transmit the non-IP data to the SCS/AS.

9. The SCEF of claim 8, wherein
if the UE is roaming, the non-IP data is transmitted through an interworking SCEF (IWK-SCEF).

10. The SCEF of claim 7, wherein the controller is further configured to:
receive the non-IP data from the SCS/AS;
determine whether the SCS/AS is authorized to send the non-IP data and that the SCS/AS exceed a rate of data allowed for the SCS/AS; and
transmit the non-IP data to the UE if the SCS/AS is authorized and does not exceed the rate of data.

* * * * *